US012159749B2

(12) United States Patent
Cai et al.

(10) Patent No.: US 12,159,749 B2
(45) **Date of Patent: *Dec. 3, 2024**

(54) TRANSFORMER MODULE AND POWER MODULE

(71) Applicant: Delta Electronics (Shanghai) Co., Ltd., Shanghai (CN)

(72) Inventors: Chaofeng Cai, Shanghai (CN); Xiaoni Xin, Shanghai (CN); Jianhong Zeng, Shanghai (CN); Shouyu Hong, Shanghai (CN); Rui Wu, Shanghai (CN); Haoyi Ye, Shanghai (CN); Yiqing Ye, Shanghai (CN); Jinping Zhou, Shanghai (CN); Zhiheng Fu, Shanghai (CN); Min Zhou, Shanghai (CN); Yu-Ching Kuo, Shanghai (CN); Tong-Sheng Pan, Shanghai (CN); Wen-Yu Lin, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,818

(22) Filed: Oct. 25, 2023

(65) Prior Publication Data

US 2024/0055182 A1 Feb. 15, 2024

Related U.S. Application Data

(63) Continuation of application No. 17/818,980, filed on Aug. 11, 2022, now Pat. No. 11,842,847, which is a (Continued)

(30) Foreign Application Priority Data

Nov. 2, 2018 (CN) ........................ 201811301174.6
Oct. 29, 2019 (CN) ........................ 201911035920.6

(51) Int. Cl.
*H01F 27/28* (2006.01)
*H01F 41/02* (2006.01)
(Continued)

(52) U.S. Cl.
CPC ......... *H01F 41/08* (2013.01); *H01F 41/0213* (2013.01); *H01F 41/064* (2016.01); *H01F 30/08* (2013.01); *H01F 41/04* (2013.01)

(58) Field of Classification Search
CPC .... H01F 41/08; H01F 41/064; H01F 41/0213; H01F 30/08; H01F 27/2895;
(Continued)

(56) References Cited

U.S. PATENT DOCUMENTS 3,826,967 A 7/1974 Wilkinson et al.
4,777,465 A 10/1988 Meinel
(Continued)

FOREIGN PATENT DOCUMENTS

CN 1202265 A 12/1998
CN 1377278 A 10/2002
(Continued)

OTHER PUBLICATIONS

Afia Khan et al, Design and Comparative Analysis of Litz and Copper Foil Transformers for High Frequency Applications, IEEE, 2018.
(Continued)

*Primary Examiner* — Shawki S Ismail
*Assistant Examiner* — Kazi S Hossain
(74) *Attorney, Agent, or Firm* — CKC & Partners Co., LLC

(57) ABSTRACT

The present disclosure provides a transformer module and a power module, wherein the transformer module comprises: a magnetic core, a first wiring layer, a first insulating layer and a second wiring layer, where the first wiring layer, the
(Continued)

first insulating layer and the second wiring layer are sequentially disposed on the magnetic core from outside to inside; a first metal winding, formed in the first wiring layer, where at least part of the first metal winding is wound around the magnetic core in a foil structure; the first insulating layer, at least partially covered by the first metal winding; a second metal winding, formed in the second wiring layer and wound around the magnetic core, where the second metal winding is at least partially covered by the first insulating layer, and at least partially covered by the first metal winding.

19 Claims, 28 Drawing Sheets

Related U.S. Application Data continuation of application No. 16/671,158, filed on Oct. 31, 2019, now Pat. No. 11,450,480.

(51) Int. Cl.
*H01F 41/064* (2016.01)
*H01F 41/08* (2006.01)
*H01F 30/08* (2006.01)
*H01F 41/04* (2006.01)

(58) Field of Classification Search
CPC ......... H01F 27/2852; H01F 2027/2809; H01F 2027/2857; H01F 27/29; H01F 27/2804
USPC .......................................................... 336/221
See application file for complete search history.

(56) References Cited

U.S. PATENT DOCUMENTS

| | | | |
|---|---|---|---|
| 5,631,822 | A | 5/1997 | Silberkleit et al. |
| 5,877,666 | A | 3/1999 | Johnson et al. |
| 6,040,753 | A * | 3/2000 | Ramakrishnan .... H01F 17/0033 336/200 |
| 6,188,305 | B1 | 2/2001 | Chang et al. |
| 6,246,311 | B1 | 6/2001 | Finnemore et al. |
| 6,344,786 | B1 * | 2/2002 | Chin ..................... H01F 27/325 336/208 |
| 7,468,649 | B2 | 12/2008 | Chandrasekaran |
| 8,295,066 | B2 | 10/2012 | Lin |
| 9,001,524 | B1 | 4/2015 | Akre |
| 9,472,334 | B2 | 10/2016 | Syvaranta et al. |
| 10,297,379 | B2 | 5/2019 | Gold et al. |
| 11,664,157 | B2 | 5/2023 | Hong et al. |
| 2002/0088269 | A1 | 7/2002 | Cavallaro et al. |
| 2005/0088269 | A1 | 4/2005 | Hatano |
| 2007/0139976 | A1 | 6/2007 | deRochemont |
| 2008/0239759 | A1 | 10/2008 | Nakahori |
| 2008/0247195 | A1 * | 10/2008 | Nakahori .............. H02M 7/003 363/20 |
| 2009/0109710 | A1 * | 4/2009 | Nakahori ................ H01F 27/40 363/17 |
| 2010/0164670 | A1 | 7/2010 | Nakahori |
| 2010/0188183 | A1 | 7/2010 | Shpiro |
| 2010/0232181 | A1 | 9/2010 | Nakahori |
| 2012/0002387 | A1 * | 1/2012 | Park ....................... H05B 41/02 361/679.01 |
| 2012/0056297 | A1 | 3/2012 | Akhtar et al. |
| 2013/0027173 | A1 * | 1/2013 | Ohsawa ................ H01F 27/306 336/220 |
| 2013/0293336 | A1 | 11/2013 | Lo et al. |
| 2013/0328165 | A1 | 12/2013 | Harburg et al. |
| 2014/0062646 | A1 | 3/2014 | Morrissey et al. |
| 2014/0266546 | A1 | 9/2014 | Mao |
| 2016/0043569 | A1 | 2/2016 | Dally et al. |
| 2016/0086709 | A1 | 3/2016 | Quilici |
| 2016/0261179 | A1 | 9/2016 | Blanchard et al. |
| 2017/0018349 | A1 | 1/2017 | Otsubo et al. |
| 2017/0025218 | A1 | 1/2017 | Sugiyama et al. |
| 2017/0084384 | A1 * | 3/2017 | Otsubo ................... H01F 17/06 |
| 2017/0117090 | A1 | 4/2017 | Liu et al. |
| 2017/0178787 | A1 | 6/2017 | Massolini et al. |
| 2017/0222562 | A1 | 8/2017 | Nakahori |
| 2017/0345756 | A1 | 11/2017 | Yin et al. |
| 2018/0175736 | A1 | 6/2018 | Ishigaki |
| 2018/0211761 | A1 | 7/2018 | Zhang et al. |

FOREIGN PATENT DOCUMENTS

| | | | |
|---|---|---|---|
| CN | 1516205 | A | 7/2004 |
| CN | 1747083 | A | 3/2006 |
| CN | 101051549 | A | 10/2007 |
| CN | 201478093 | U | 5/2010 |
| CN | 101772264 | A | 7/2010 |
| CN | 102360852 | A | 2/2012 |
| CN | 102428528 | A | 4/2012 |
| CN | 102460608 | A | 5/2012 |
| CN | 202839237 | U | 3/2013 |
| CN | 103269149 | A | 8/2013 |
| CN | 103943306 | A | 7/2014 |
| CN | 104376955 | A | 2/2015 |
| CN | 105099132 | A | 11/2015 |
| CN | 105261459 | A | 1/2016 |
| CN | 105304287 | A | 2/2016 |
| CN | 205177580 | U | 4/2016 |
| CN | 205194481 | U | 4/2016 |
| CN | 105590734 | A | 5/2016 |
| CN | 105789031 | A | 7/2016 |
| CN | 205542253 | U | 8/2016 |
| CN | 106328633 | A | 1/2017 |
| CN | 206389608 | U | 8/2017 |
| CN | 107210123 | A | 9/2017 |
| CN | 107294390 | A | 10/2017 |
| CN | 207082424 | U | 3/2018 |
| DE | 3732249 | A1 | 4/1989 |
| DE | 19725865 | A1 | 1/1998 |
| DE | 19954682 | C1 | 8/2001 |
| EP | 3648128 | A2 | 5/2020 |
| EP | 4170689 | A1 | 4/2023 |
| JP | 59186313 | | 10/1984 |
| JP | H05315520 | A | 11/1993 |
| JP | 2008305620 | A | 12/2008 |
| JP | 2015228436 | A | 12/2015 |
| TW | 490688 | B | 6/2002 |
| TW | 201023216 | A | 6/2010 |
| TW | 201440089 | A | 10/2014 |
| WO | 2020033325 | A1 | 2/2020 |
| WO | 2022006691 | A1 | 1/2022 |

OTHER PUBLICATIONS

Extended European search report of EP19205670.3 issued on Apr. 24, 2020.
Extended European search report of EP19206771.8 issued on Feb. 13, 2020.
Extended European search report of EP23152555.1 issued on Jun. 19, 2023.
Office Action of CN201811301185.4 issued on Apr. 6, 2021.
Office Action of EP19206771.8 issued on Mar. 19, 2021.
Office Action of CN202110657236.2 issued on Apr. 19, 2022.
Office Action of CN201911035920.6 issued on Oct. 20, 2020.
Office Action of CN201910912171.4 issued on Jul. 26, 2021.
Office Action of U.S. Appl. No. 16/653,970 issued on Dec. 8, 2022.
Office Action of U.S. Appl. No. 16/671,153 issued on Sep. 22, 2023.
Office Action of U.S. Appl. No. 17/024,720 issued on Aug. 11, 2023.
Notice of Allowance of CN201911035920.6 issued on Apr. 19, 2021.
Notice of Allowance of CN202110657236.2 issued on Oct. 19, 2022.
Notice of Allowance of U.S. Appl. No. 16/653,970 issued on Mar. 20, 2023.
Notice of Allowance of U.S. Appl. No. 16/695,196 issued on May 5, 2021.
Extended European search report of EP23208924.3 issued on Feb. 26, 2024.

(56) References Cited

OTHER PUBLICATIONS

Extended European search report of EP24163741.2 issued on Jun. 28, 2024.
Notice of Allowance of U.S. Appl. No. 18/492,801 issued on May 22, 2024.

* cited by examiner

TRANSFORMER MODULE AND POWER MODULE

CROSS-REFERENCE TO RELATED APPLICATION

This application is a continuation of U.S. patent application Ser. No. 17/818,980 filed on Aug. 11, 2022, which is a continuation of U.S. patent application Ser. No. 16/671,158 filed on Oct. 31, 2019, which claims priorities to Chinese Patent Application No. 201811301174.6 filed on Nov. 2, 2018 and Chinese Patent Application No. 201911035920.6 filed on Oct. 29, 2019. The disclosures of the above applications are hereby incorporated by reference in their entireties.

TECHNICAL FIELD

The present disclosure relates to the field of transformer technologies, and more particularly to a transformer module and a power module.

BACKGROUND

With the improvement of human requirements for smart living, the demand for data processing in society is growing. The global energy consumption in data processing averagely reaches hundreds of billions or even trillions of kilowatt-hour per year; and the area of a large data center may be tens of thousands of square meters. Therefore, high efficiency and high power density are the key indicators for the healthy development of this industry.

The key unit of the data center is the server which usually includes data processing chips on a motherboard including such as a central processing unit (CPU), chipsets, a memory, and their power supply and other necessary peripheral components. As the processing capacity of a server increases, the number and integration level of these processing chips also increase, which results in an increase in the volume and power consumption of the server. Therefore, the power supply for these chips (because it is on the same motherboard as the data processing chips, also referred to as the motherboard power supply), is expected to have higher efficiency, higher power density and smaller volume to support the energy saving and space reducing requirements of the entire server or even the entire data center. In order to meet the demand of high power density, the switching frequency of the power supply is also higher and higher. The switching frequency of the low-voltage and high-current power supply in the industry is basically 1 Megahertz (MHz).

The transformers for low-voltage and high-current applications are mostly implemented by a multi-layer printed circuit board (PCB). FIG. 1A is a side view of a transformer having a multi-layer PCB winding provided by the prior art. For example, as shown in FIG. 1A, the winding is formed horizontally on the different layers of the PCB board, and the PCB board is usually sleeved on the magnetic columns of the core, so that the magnetic columns are vertical or nearly vertical to the PCB board, such that the magnetic columns are vertical or nearly vertical to the respective winding layers on the PCB board. And the thickness W of the winding is parallel to the length direction of the magnetic column; and the width H of the metal winding is vertical to the length of the magnetic column. Due to the PCB winding process, H and W generally satisfy the following relationship: H>10 W. In this PCB winding structure, the winding on different layers are connected by vias, since the layers are vertical to the magnetic columns, the vias are parallel to the magnetic columns. The winding on the inner layer is generally connected to that on the outer layer and the pins on the surface of the PCB (not shown) through vias. Generally, for the less than 5V voltage and larger than 50 A current output applications, a transformer with at least ten-layers PCB is needed. And the height of a ten-layer PCB is about 2 mm. Thus the length of the via is long and the impedance of the via is large, so the loss caused by the via is large. FIG. 1B shows the top view of the winding on the right magnetic column of the core. In FIG. 1B, the winding on the same layer may be separated into several concentric circles with different diameters $R_{1A}$, $R_{2A}$, . . . , $R_{nA}$. Since the concentric circles have different diameters, they have different impedances. So there is a problem of uneven current distribution of the winding on one layer.

FIG. 2 is a structural schematic diagram of a transformer module. For convenience of description, in the schematic diagram, the shape of the winding, and the positional relationship between the winding and the magnetic core are specifically drawn, but the disclosure is not limited thereto. If multiple wiring layers need to be provided, an insulating layer and a new wiring layer can be sequentially added outside the wiring layer. With reference to FIG. 2, the dimension of the winding parallel to the longitudinal direction of the magnetic column is defined as W, and the thickness of the winding which is the dimension of the winding vertical to the magnetic column of the magnetic core is H. When H and W satisfy the relationship: W>10H, we define this winding manner of the winding as a winding having a foil structure. For a winding in a foil structure, different portions of the winding have almost the same distance to the magnetic core, that is, the equivalent diameters of different portions e.g. $R_{1B}$ and $R_{2B}$ are almost the same. Thus equivalent impedance of different portions is almost the same. So the current distribution of the winding in a foil structure is almost even which reduces the winding loss greatly. Generally, the winding shown in FIG. 2 is made by a copper foil process that is the winding is made of copper foil by cutting or punching process. And in this structure, the output connectors of the winding, e.g. 21 and 22 are almost stretched out from the sides of the winding to connect to the circuits (not shown). The output connectors are always centralized, which means very few of the connectors (e.g. only two connectors for each winding in FIG. 2) are used to connect to the circuit. The very few of the connectors stretching out from the sides of the winding makes the uneven current distribution on the joint part of the connectors and the other part of the winding. In addition, centralized output connectors always have long length. Thus the loss of the connectors is large.

SUMMARY

The present disclosure provides a transformer module and a power module, thereby achieving better distribution of windings.

In a first aspect, the present disclosure provides a transformer module, including:

a magnetic core, a first wiring layer, a first insulating layer and a second wiring layer being sequentially disposed on the magnetic core from outside to inside;

a first metal winding, formed in the first wiring layer and winded around the magnetic core in a foil structure;

the first insulating layer, at least partially covered by the first metal winding;

a second metal winding, formed in the second wiring layer and winded around the magnetic core in a foil structure, wherein the second metal winding is at least partially covered by the first insulating layer, and at least partially covered by the first metal winding;

wherein, the transformer module further includes a first pin, a second pin, a third pin, and a fourth pin, the first metal winding includes a first end and a second end, the second metal winding includes a first end and a second end, the first end and the second end of the first metal winding respectively are electrically connected to the first pin and the second pin, the first end and the second end of the second metal winding are electrically connected to the third pin and the fourth pin through a first connector and a second connector respectively, and both of the first connector and the second connector pass through the first insulating layer.

In a second aspect, the present disclosure provides a power module, including:

the transformer module as described in the first aspect;

a switch module, the switch module is in contact with the first side of the transformer module and is electrically connected to the first pin and/or the second pin.

Since the transformer winding with the foil winded structure is coated on the transformer magnetic column, the equivalent diameters of respective parts of a turn of the winding having the foil winded structure are similar, and the equivalent impedances are similar, thereby achieving the better distribution of the winding.

BRIEF DESCRIPTION OF THE DRAWINGS

FIG. 10B-1 is a schematic cross-sectional view of a metal foil and an insulating layer;

FIG. 10B-2 is a schematic cross-sectional view of the metal foil before bending;

FIG. 10B-3 is a schematic cross-sectional view of the metal foil after being bent;

FIG. 10B-4 shows the manufacturing process of the metal winding;

DETAILED DESCRIPTION OF THE EMBODIMENTS

For the transformer for low-voltage and high-current applications, in the prior art, it always adopts a PCB winding structure. In the structure, the plane where the PCB board is located is vertical to the magnetic column, and the winding surrounding the magnetic column is formed by means of the trace on the PCB wiring layer. However, the PCB winding structure will cause the equivalent diameters of the inner and outer sides of the trace of the metal winding of the wiring layer to be inconsistent, resulting in the equivalent impedance of the inner side of the winding being smaller than the equivalent impedance of the outer side of the winding, so that there is a problem of uneven distribution of the windings. Thus, when the transformer is used, the corresponding current may be unevenly distributed.

While for the transformer with the foil winding structure in the prior art, the centralized output connectors of the winding are almost stretched out from the sides of the winding to connect to the circuits, which results in the uneven current distribution on the joint part of the connectors and the other part of the winding. And since the centralized output connectors stretch out from sides of the windings, they always have long length. Thus the loss of the connectors is large.

In order to solve these technical problem, the present disclosure provides a transformer module and a power module.

Embodiment 1

In one embodiment of the present disclosure, the windings in a foil structure are formed in the wiring layer by, for example, electroplating, electroless plating, spray coating, dipping, electrophoresis, electrostatic spraying, chemical vapor deposition, physical vapor deposition, evaporation or printing. A plurality of wiring layers may be disposed on the surface of the magnetic columns of the magnetic core, and an insulating layer is disposed between the adjacent wiring layers. The windings between the different wiring layers may be connected through connectors, e.g. vias, passing through the insulating layer.

Figure 3A:
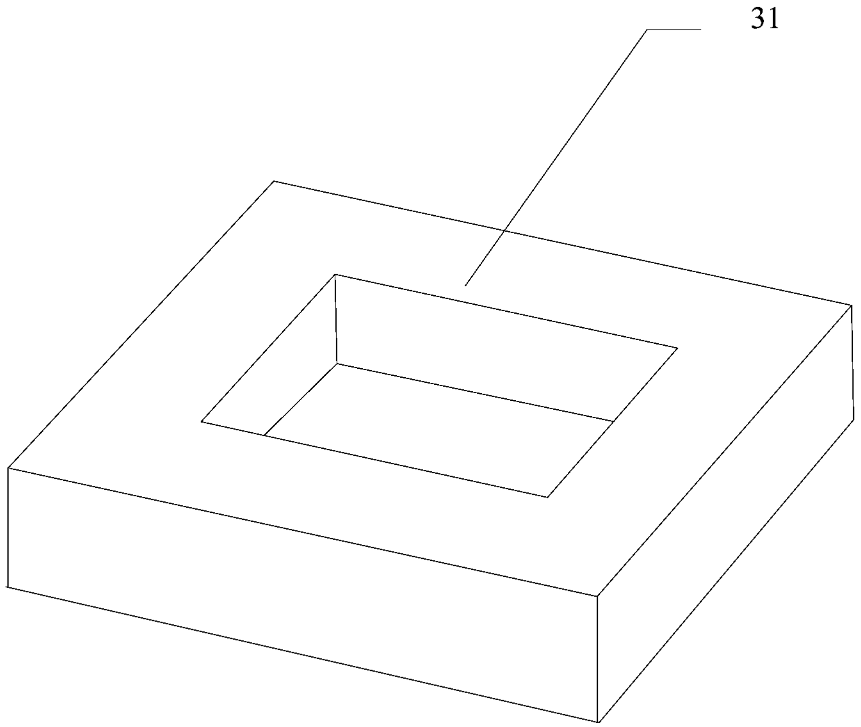
FIG. 3A is a perspective view of a magnetic core in a transformer module provided by an embodiment of the present disclosure.
Figure 3B:
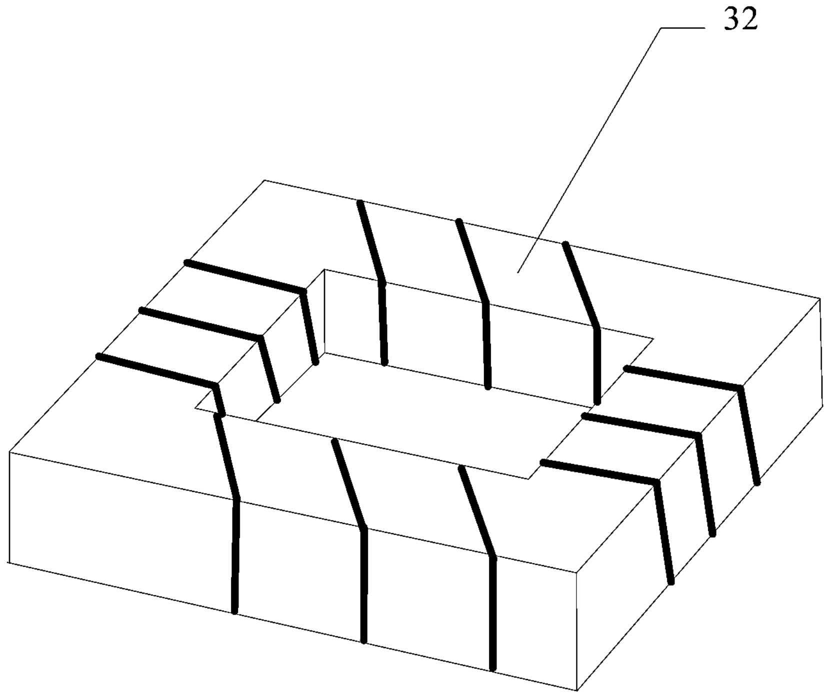
FIG. 3B is a perspective view of the magnetic core shown in FIG. 3A after forming a second metal winding.
Figure 3C:
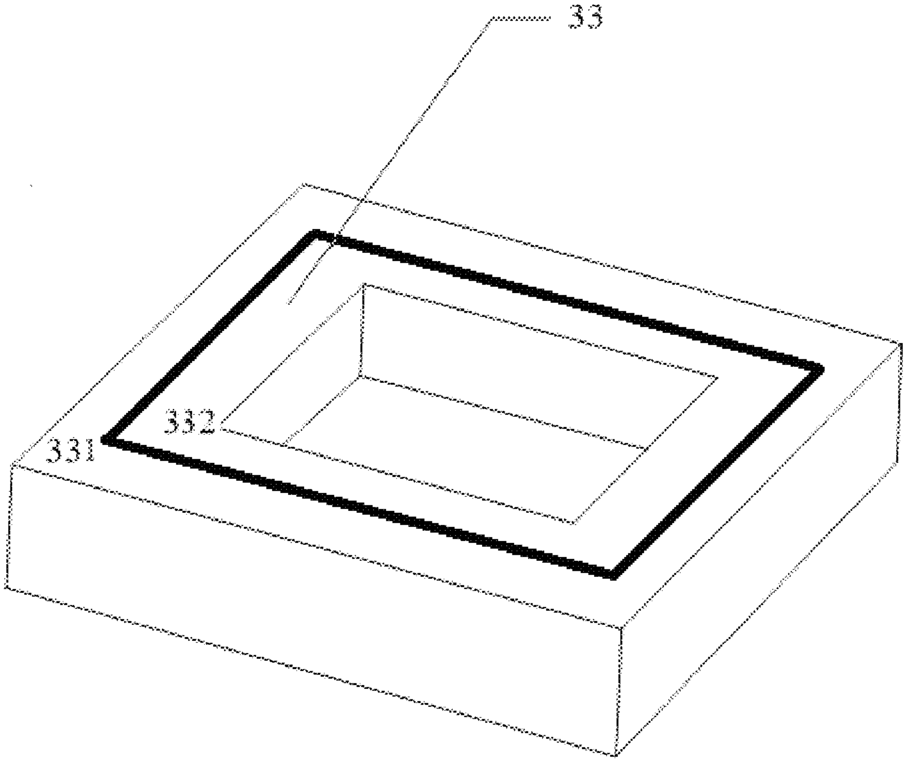
FIG. 3C is a perspective view of the module shown in FIG. 3B after forming a first metal winding.
Figure 3D:
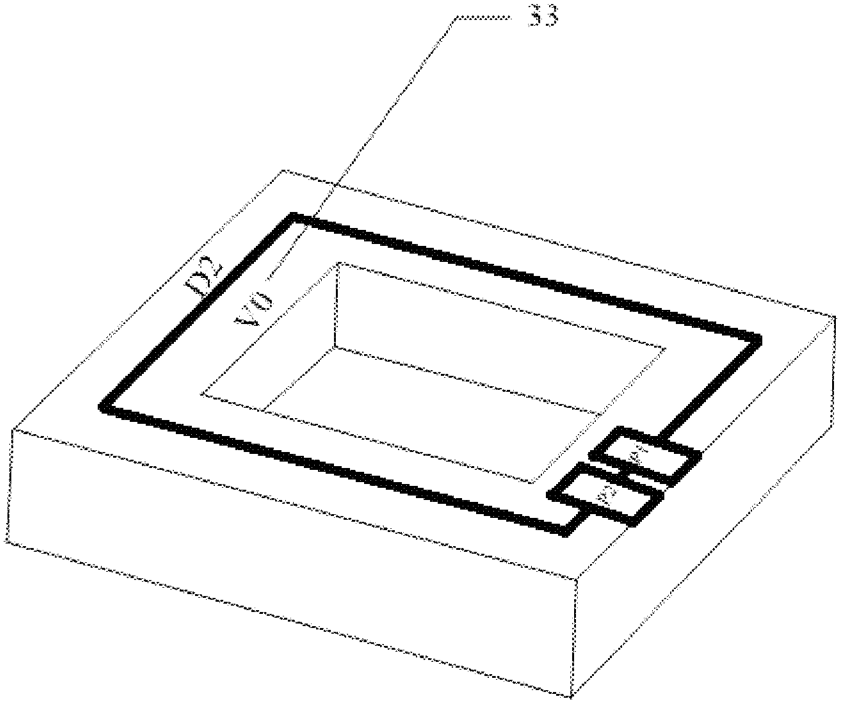
FIG. 3D is a perspective view of a transformer module provided by an embodiment of the present disclosure.
Figure 3E:
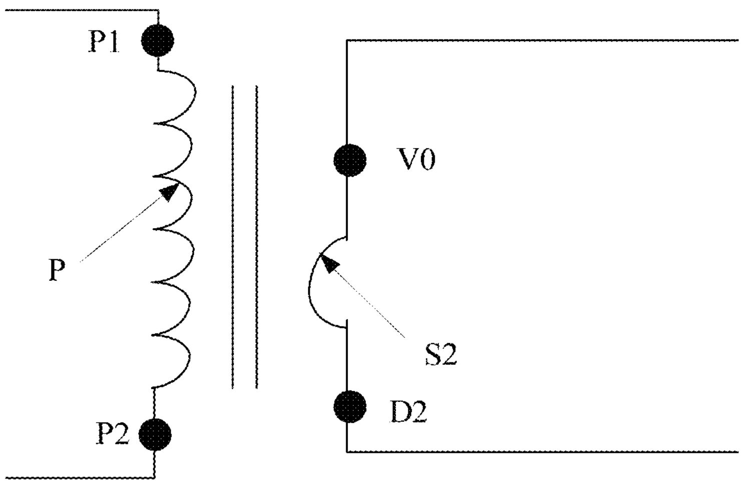
FIG. 3E is an electrical schematic diagram of each end of the transformer module shown in FIG. 3C.

FIG. 3A is a perspective view of a magnetic core in a transformer module provided by an embodiment of the present disclosure; FIG. 3B is a perspective view of the transformer after forming a second metal winding on the magnetic core shown in FIG. 3A; FIG. 3C is a perspective view of an embodiment of the present disclosure after forming a first metal winding (bottom up) on the transformer module shown in FIG. 3B; FIG. 3D is a perspective view by forming the ends (for example, a surface-mounted pin) on the transformer module shown in FIG. 3C, and FIG. 3E is an electrical schematic diagram corresponding to the pins of the transformer module shown in FIG. 3D. Referring to FIG. 3A to FIG. 3E, the transformer module includes a magnetic core 31, a first metal winding 33 (as shown in FIG. 3E, the first metal winding is, for example, a secondary winding S2 of the transformer module) and a second metal winding 32 (as shown in FIG. 3E, the second metal winding is, for example, the primary winding P of the transformer module).

In some embodiments, the magnetic core is 口 -shaped (that is, hollow square shaped), ring shaped, an I-shaped or C-shaped. For example, the magnetic core 31 shown in FIG. 3A is a 口 -shaped magnetic core. This disclosure does not limit the shape of the magnetic core.

The number of turns of the first metal winding (e.g. the secondary winding S2) may be one turn or plural turns. For example, the number of turns of the first winding 33 shown in FIG. 3C is one turn.

In some embodiments, the number of turns of the second metal winding (e.g. the primary winding P) may be one turn or plural turns. For example, as shown in FIG. 3B, the number of turns of the second winding 32 is plural turns which forms a spiral type winding around a plurality of magnetic columns of the 口 -shaped magnetic core, wherein the thick black line shown in FIG. 3B-FIG. 3D is an insulating layer exposed between the turns of the metal winding, so is the thick black lines shown in the following figures.

Specifically, the first wiring layer, the first insulating layer, and the second wiring layer are sequentially disposed from the outside to the inside on the magnetic core. As shown in FIG. 3B, the metal winding 32 is formed in the second wiring layer by e.g. an etching process or a copper foil winding process such that the second winding 32 winds around the four magnetic columns of the magnetic core 31 in a foil structure. After the second winding 32 in the second wiring layer is formed covering the magnetic core 31, a first insulating layer is disposed outside the second wiring layer, and then a first wiring layer is disposed outside the first insulating layer, wherein the first insulating layer is used for the insulation between the first wiring layer and the second wiring layer. And therefore, the second wiring layer is at least partially covered by the first insulating layer and at least partially covered by the first wiring layer. As shown in FIG. 3C, the first metal winding 33 e.g. a one-turn winding is formed in the first wiring layer and winds around all the magnetic columns of the magnetic core 31 in a foil structure. The first winding 33 wraps around the magnetic core 31 and also at least partially covers the second winding 32. Therefore, the second winding is also at least partially covered by the first winding, and the first insulating layer is also at least partially covered by the first winding. The cover described in the present disclosure may be contact cover or non-contact cover, such as projection cover. As described above, the “cover” in “the first insulating layer is at least partially covered by the first metal winding” means contact cover. The “cover” in “the second metal winding is at least partially covered by the first insulating layer” also refers to contact cover. The “cover” in “the second metal winding is at least partially covered by the first metal winding” means non-contact cover, that is, projection cover.

Specifically, in an embodiment, an initial insulating layer may be selectively attached to the surface of the magnetic core by spraying or deposition, and the initial insulating layer has the function of enhancing the bonding force and protecting the magnetic core, but the present disclosure is not limited to this, alternatively, the initial insulating layer may be or may not be provided. A second wiring layer may be a metal layer e.g. a copper layer and disposed on the core by electroplating or electroless plating process; and then a metal protective layer, such as a tin layer or a gold layer, is disposed on the surface of the second wiring layer by electroplating or electroless plating; then the metal protective layer is patterned by a writing process to expose a portion of the second wiring layer which needs to be etched; and then the portion of the second wiring layer which needs to be etched are etched under the protection of the metal protective layer to form a second metal winding; finally, the protective layer is removed and the second winding, e.g. the primary winding P comes into being as FIG. 3B shows. Then, the first insulating layer is selectively attached to the second metal winding by spraying or deposition, and the first insulating layer has the function of enhancing the bonding force and protecting the magnetic core. And a similar process is adopted. A first wiring layer is provided on the surface by plating or electroless plating, the first wiring layer may be a copper layer; then a metal protective layer is electroplated or electroless plated on the surface of the first wiring layer, such as a tin layer or a gold layer; and then the metal protective layer is patterned by a writing process to expose a portion of the first wiring layer which needs to be etched; and then the portion of the first wiring layer are etched under the protection of the metal protective layer to form a first metal winding; finally, the protective layer is removed to expose the first metal winding, e.g. the secondary winding S2. However, the present disclosure is not limited thereto, and other winding forming processes are also applicable. For example, the first and second winding may be the copper foils made by e.g. a punching or cut process to wind around the columns of the core. Or the first winding may be the copper foil winding and the second winding may be the litz wire winding winded around the columns of the core.

In this embodiment, it can be seen that the second winding 32 is a spiral winding with plural turns surrounding all the columns of the□ -shaped (or hollow-square shaped) magnetic core. The first winding 33 has one turn and also wraps all the magnetic columns of the□ -shaped magnetic core. As a matter of fact, the second winding 32 may wind some columns of the core, e.g. one or two columns of the core, even a part of one magnetic column of the core. So does the first winding 33. As shown in FIG. 3C, a gap splits the winding 33 and forms two ends 331, 332 of the winding on the bottom surface of the magnetic core by etching, cutting process etc.

Further, in conjunction with FIG. 3B to FIG. 3E, in this embodiment the second metal winding 32 also has a first end and a second end, which are covered by an insulating layer and the first winding 33 and connected to the third output pin P1 and the fourth output pin P2 (shown in FIG. 3D) by a first connector e.g. a via and a second connector e.g. a via (not shown) respectively for electrical connection with an external circuit. And both the first connector and the second connector just pass through the first insulating layer. Thus, the length of the connectors is very short, and the loss the connectors are small. Generally, there are multiple first and second connectors distributed on the corresponding pads. Then the current distribution is more even. The first metal winding 33 is, for example, a secondary winding of the transformer, and the second metal winding 32 is, for example, a primary winding of the transformer. And in this embodiment, the two output pins P1 and P2 are both the surface-mounted pins. Actually, they may be other types of pins, such as, DIP pins, pins made by coils etc.

The transformer module is connected to an external circuit (such as a switch module) by the first output pin V0, the second output pin D2, the third output pin P1, and the fourth output pin P2, wherein in this embodiment these pins are all surface-mounted pins and they may be other types of pins, such as DIP pins etc. For example, if the first winding is the copper foil made by punching or cut process, then the pins may also be made by the copper foil. That is to say, the pins and the first winding are integrated. The first surface-mounted pin V0, the second surface-mounted pin D2, the third surface-mounted pin P1, and the fourth surface-mounted pin P2 are all located on the first side (for example, the bottom surface) of the transformer module. In this embodiment, the first side of the transformer module is the outer surface of the first wiring layer. The first side may also be a surface in parallel with the outer surface of the first wiring layer, wherein the surface in parallel with the outer surface may be close to the outer surface and the distance between two surfaces are small, for example, not more than 1 mm, which facilitates external assembly and connection. However, the disclosure is not limited thereto.

The first pin V0, the second pin D2, the third pin P1 or the fourth pin P2 may have various shapes, such as a square shape or a circle shape. In some embodiments, the first pin V0, the second pin D2, the third pin P1 or the fourth pin P2 may be surface-mounted pins. In FIG. 3D, D2 and V0 may be big hollow square shape pads or circle shape pads without P1 and P2 pins, while P1 and P2 are small rectangular shape pads.

In some embodiments, in the above embodiment, the first surface-mounted pin V0, the second surface-mounted pin D2, the third surface-mounted pin P1, and the fourth surface-mounted pin P2 may be located on the different sides of the transformer module, for example, V0 and D2 can be located on the first side of the transformer module, while P1 and P2 can located on the second side of the transformer module, wherein the first side and the second side are different sides.

Figure 10A:
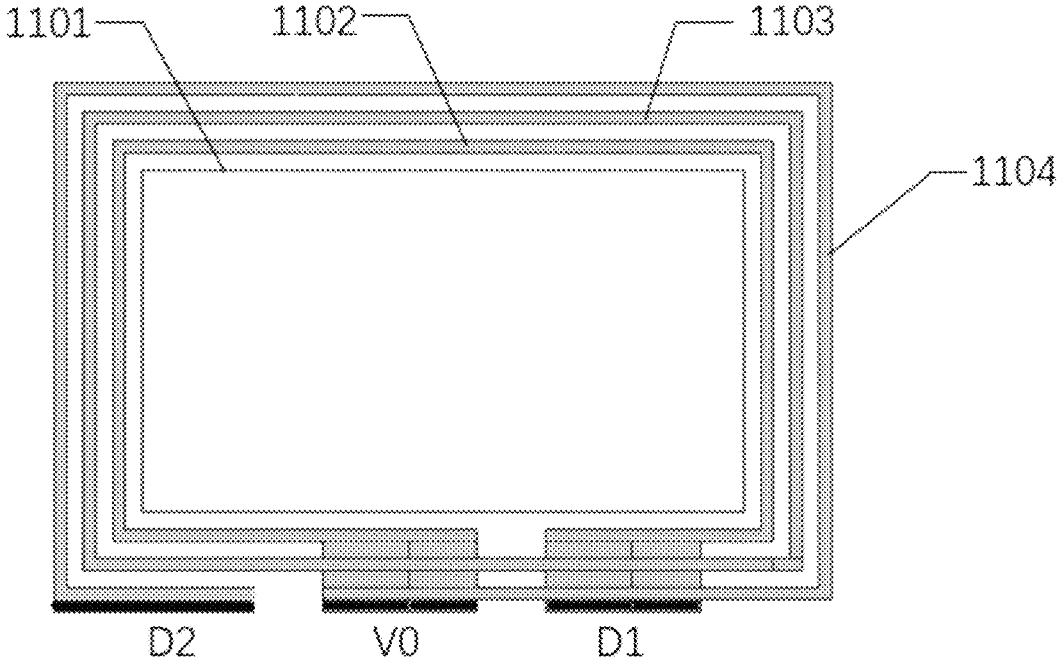
FIG. 10A is cross-sectional view of a transformer in an embodiment of the present disclosure.
Figure 10B:
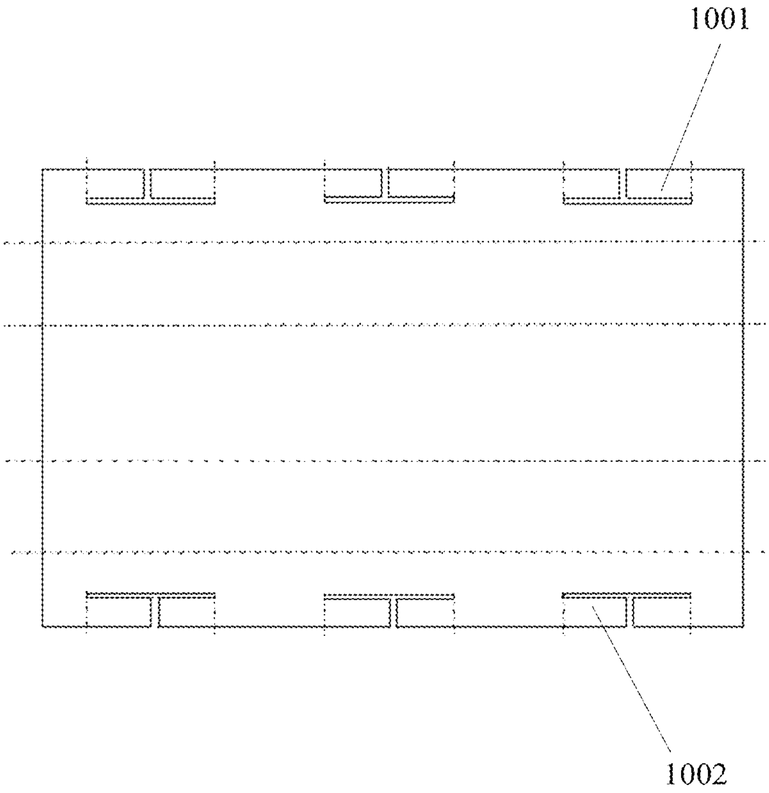
FIG. 10B is a plan view of a winding in an embodiment of the present disclosure.
Figure 10C:
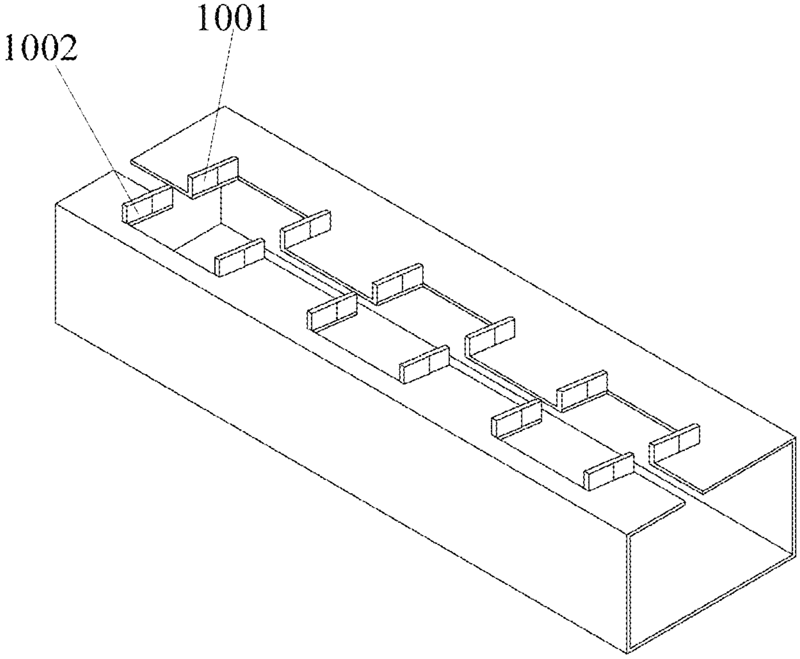
FIG. 10C is a perspective view of a winding in an embodiment of the present disclosure.
Figure 10D:
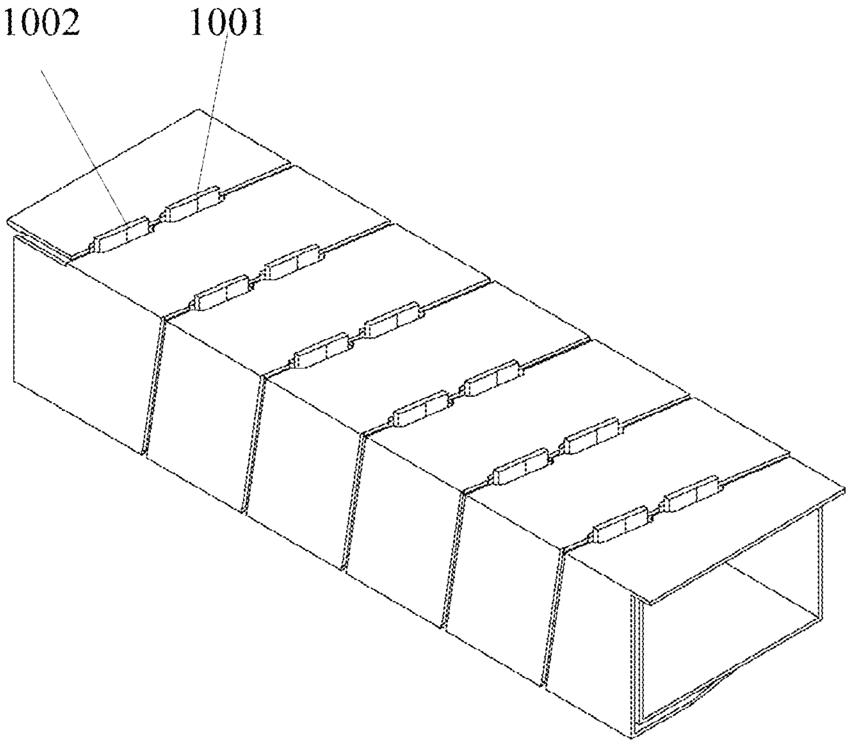
FIG. 10D is a perspective view of a winding in an embodiment of the present disclosure.
Figure 10E:
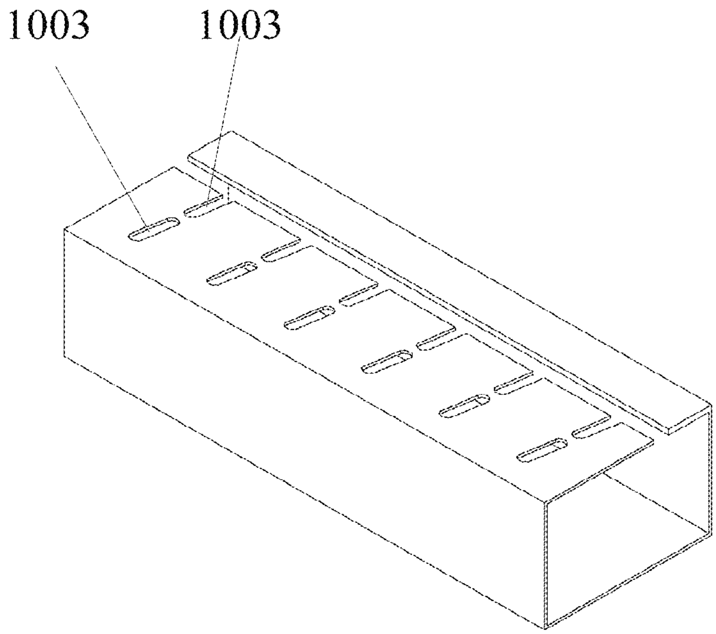
FIG. 10E is a perspective view of a winding in an embodiment of the present disclosure.
Figure 10F:
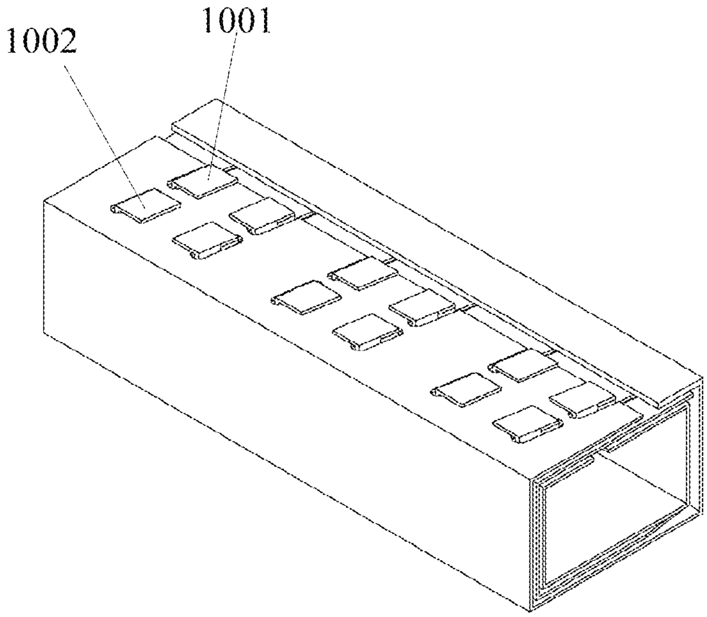
FIG. 10F is a perspective view of a winding in an embodiment of the present disclosure.
Figure 10G:
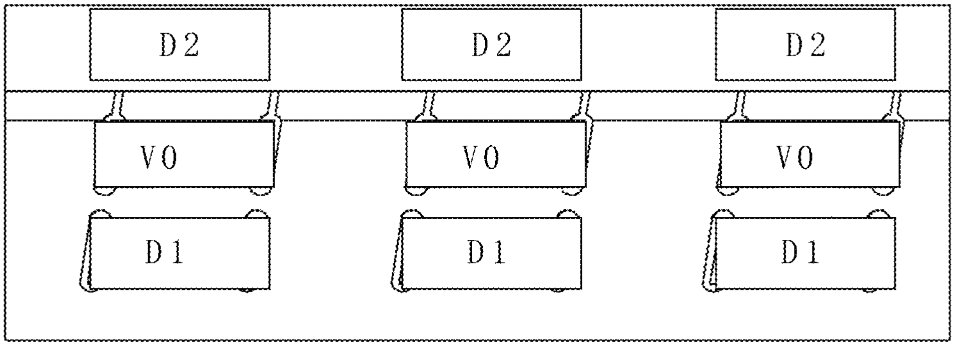
FIG. 10G is a schematic view of arrangement of pins in an embodiment of the present disclosure.
Figures 1, 10B:
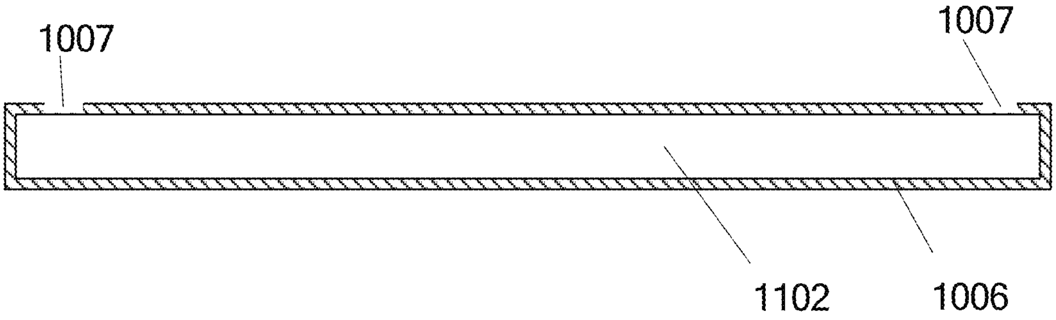
Figures 2, 10B:
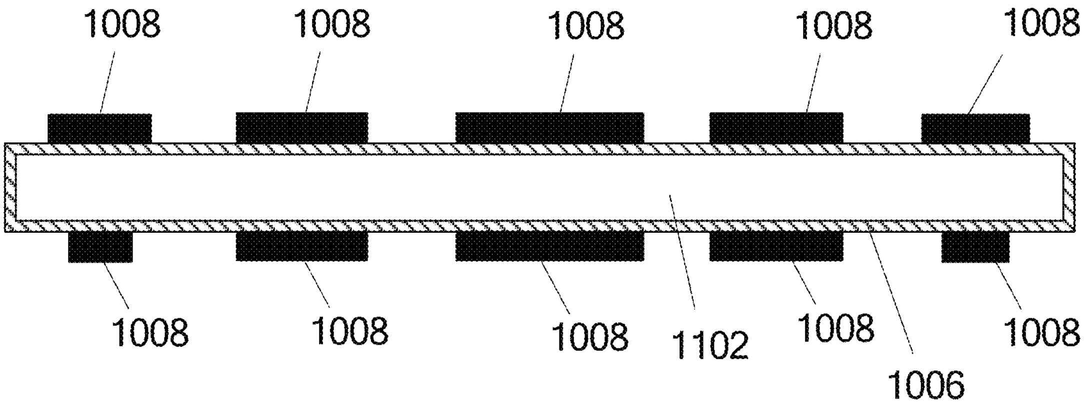

In the prior art shown in FIG. 1, for a multilayer PCB transformer, the winding has different radii of different parts of the same layer winding, so that the impedance of the inner ring of the same layer winding is smaller than the impedance of the outer ring, so the current distribution on the same layer winding is not uniform, and the loss of the winding is correspondingly larger. And the windings in different layers are connected to each other through vias. But in the traditional PCB process, the diameters of these vias are big, usually larger than 150 microns. The distance between two vias is typically greater than 150 microns for structure and pattern considerations. In this embodiment, since the traditional PCB board is no longer disposed, the first via and the second via may be directly formed in the first insulating layer by laser drilling or the like, so that the first via and the second via have smaller diameter, which can increase the number of via and further reduce the impedance of via. However, the disclosure is not limited thereto.

The vias may be hollow generally. However, by adjusting the electroplating agent the vias may also be filled with metal, e.g. copper for winding loss reduction.

Further, as described above, in a PCB winding structure, the windings in different layers may connect to each other through vias. Generally, such vias are long and have large impedance, and the winding loss caused by the vias is large. In this embodiment, since the insulating layer such as the first insulating layer has a thickness less than 200 μm which is much smaller than the insulating layer of the PCB winding structure, the first via and/or the second via are short and the impedance is small, so that the loss of the winding caused by the vias can be reduced greatly.

Further, in the prior art, the pins of the secondary winding of the transformer of the multi-layer PCB structure can only be led out on the surface of the PCB, and the pins of the secondary winding of the inner layer can only be led to the surface of the PCB through the vias, thus causing that the current is concentrated and the winding loss is excessive. In some embodiments of the present disclosure, the metal winding as the secondary side may be evenly foil winded around the magnetic core, and a plurality of sets of corresponding surface-mounted pins may be uniformly distributed on the first side of the magnetic core, thus the current is evenly distributed on the whole winding. Based on this, the winding loss can be reduced.

Further, the power of the transformer module provided by some embodiments of the present disclosure is easy to expand, and all the magnetic column can be covered with a winding to improve the power of the transformer module. The magnetic module can be lengthened and the winding can be widened to increase the power of the transformer module.

As described in this embodiment of this application, the transformer winding is in a foil structure, the equivalent diameters of each part of the winding are similar, thus the equivalent impedances of each part are similar, thereby an almost even current distribution of the winding is achieved. The inner winding connects to the output pins by the connector passing through the insulation layer between the wiring layers that inner winding and the outer winding lay on which reduces the length of the connector greatly when compared with the prior art in FIG. 2. So the loss of the connector is reduced greatly. Furthermore, as shown in FIG. 3D, the connectors or the pinouts may be plurals and distributed which can further improve the even current distribution of the winding. So the loss of the winding reduces greatly.

Figure 3F:
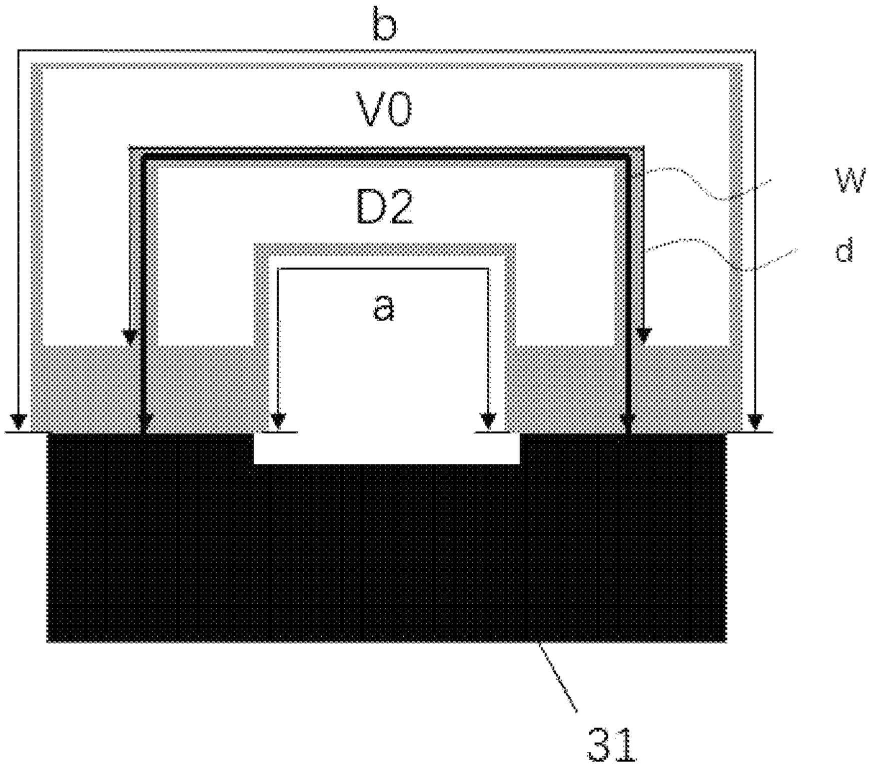
FIG. 3F is a perspective view of the winding of FIG. 3C with two pins.
Figure 3G:
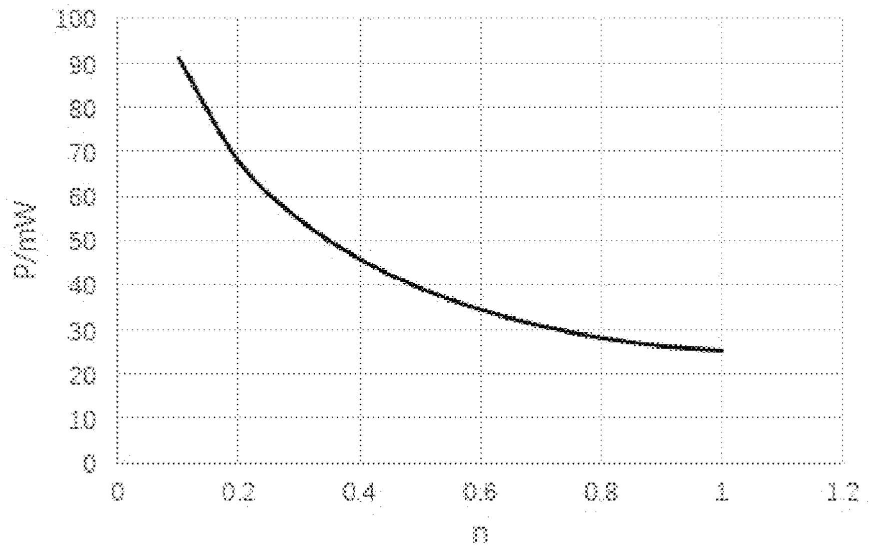
FIG. 3G is a schematic diagram showing the relationship between the ratio n of the length of the pin and the length of the winding and the winding loss P.

As shown in FIG. 3C and FIG. 3D, the first metal winding is a copper foil wound around the magnetic core in a foil structure continuously, the winding covers four magnetic core columns, and the two ends of the winding are respectively connected to the two pins V0 and D2, these two pins are connected to external circuits such as switch devices, etc., wherein the number of each of pins V0 and D2 is one, as shown in FIG. 3D. The structure shown in FIG. 3F is slightly different from 3D. In FIG. 3F, the metal winding continuously winds on part of the magnetic columns of the ⊓ -shaped core, such as three magnetic columns. The two ends of the winding are still connected to the two pins V0 and D2, and the number of each of the pins V0 and D2 is also one. Taking FIG. 3F as an example, from the side of the transformer, a is the inner length of the winding, and b is the outer length of the winding. Therefore, it can be considered that the average length of the winding $W=(a+b)/2$, and d is the average length of the pins on the winding, n is the ratio of the pin length to the winding length, $n=d/W$. Since the windings are connected to the external circuit through the pins, the length of d will affect the uniformity of the current distribution on the winding. For the average length of a certain winding, as d increases, the current distribution will become more uniform and the winding loss will become smaller and smaller. As shown in FIG. 3G, the abscissa in FIG. 3G is n, and the ordinate P is the winding loss, as n increases, the corresponding winding loss is greatly reduced. Preferably, when $d \geq \frac{1}{2} W$, the winding loss is small and tends to be stable. In FIG. 3D, n=1, that is, the length of the pin is almost equal to the average length of the winding, so the pin structure in FIG. 3D can make the current distribution on the winding more uniform, and correspondingly the winding loss is smaller. In this application, the magnetic core is not limited to the □ -shape, and is also applicable to the magnetic cores of the T-shape, UU-shape and UI-shape.

Figure 3H:
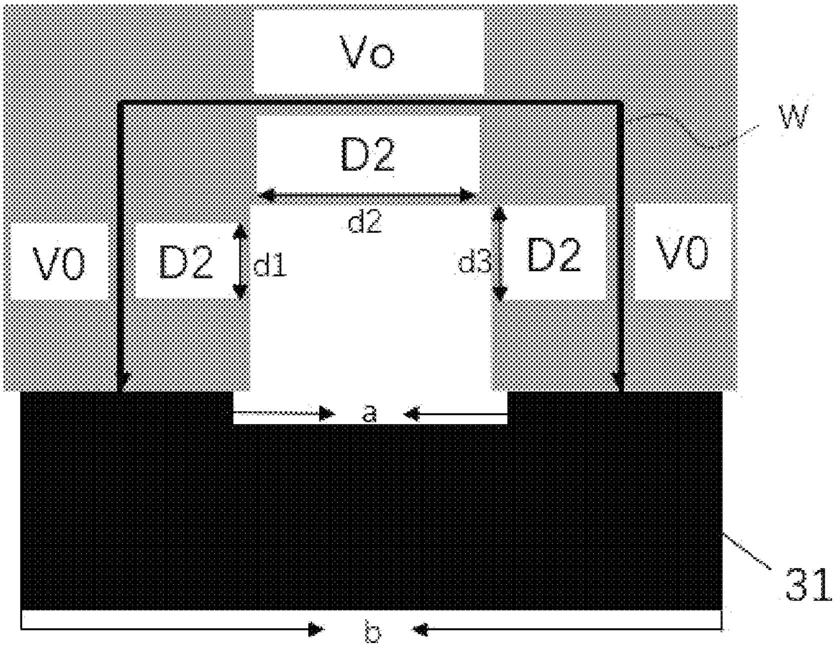
FIG. 3H is a perspective view of the winding of FIG. 3C with a plurality of pins.

Similarly, for the plurality of pins of the secondary winding, as shown in FIG. 3H which is similar to FIG. 3F, both of them include a □ -shaped magnetic core, and a continuous winding wound on three magnetic columns. Different from FIG. 3F, the winding of FIG. 3H includes a plurality of first pins V0 and a plurality of second pins D2, that is, the numbers of the first pin V0 and the numbers of the second pin D2 are both greater than or equal to 2. As shown in FIG. 3H, the total length of the pin includes three parameters: d1, d2, and d3, and the total length of the pin is d=d1+d2+d3. In FIG. 3H, if V0 or D2 is only a single pin, the length of the V0 or D2 pin is small, that is, the ratio of the length of the pin to the average length of the winding n is relatively small, so that the corresponding winding loss is still not small. However, for a plurality of pins of V0 or D2, for example, three pins as shown in the figure, the length of the pin is greatly increased, and the ratio n of the length of the pin to the average length of the winding becomes larger, which will cause current distribution on the winding more even. It can be understood that the first pin V0 and the second pin D2 in the figure can be various shapes such as a square shape or a circle shape, for example, when the pin is a circle shape, the length of the pin can be the diameter of the circle. Furthermore, the distribution of the plurality of first pins V0 and the plurality of second pins D2 is more uniform, the current distribution in the winding is more uniform, and correspondingly, the winding loss is smaller. In general, preferably, when the total length d of the first pins V0 or the second pins D2 is greater than or equal to ½ of the winding length W, the winding loss is small and tends to be stable; the more the number of the first pins V0 or the second pins D2, the smaller the winding loss; the more uniform the distribution of the first pins V0 or the second pins D2, the smaller the winding loss.

In the present embodiment of FIG. 3C-3D, only one schematic of the transformer module in a foil structure is shown, that is, the winding in the foil winding structure covers the four magnetic columns of the magnetic core. In fact, the winding in the foil winding structure can cover one magnetic column or a plurality of magnetic columns. This application does not limit this.

Further, the transformer module provided by some embodiments of the present disclosure is easy to expand, and all the magnetic columns can be covered with a winding to improve the power of the transformer module. The magnetic columns can be lengthened and the winding can be widened to increase the power of the transformer module.

Embodiment 2

On the basis of embodiment 1, embodiment 2 of the present disclosure further provides a transformer module, wherein the magnetic core of the transformer module further includes a second insulating layer and a third wiring layer beneath the second wiring layer, so the second insulating layer is at least partially covered by the second winding.

The transformer module further includes: a third winding on the third wiring layer and winds around the magnetic core in a foil structure, wherein the third winding is also at least partially covered by the second insulating layer; and a fifth surface-mounted pin which is located on the first side of the transformer module for electrically connecting the covered third winding.

Figure 4A:
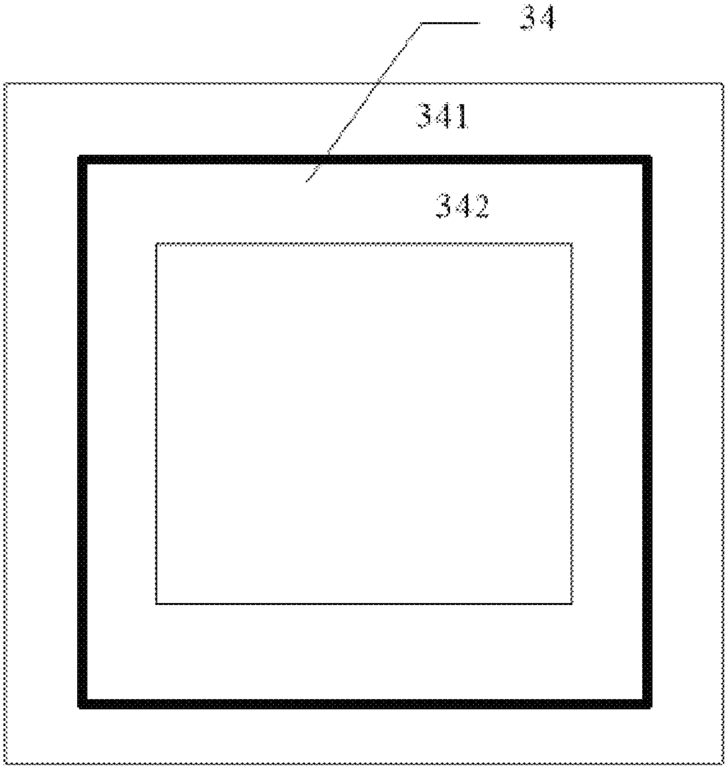
FIG. 4A is a bottom view of the transformer module after forming a third metal winding.
Figure 4B:
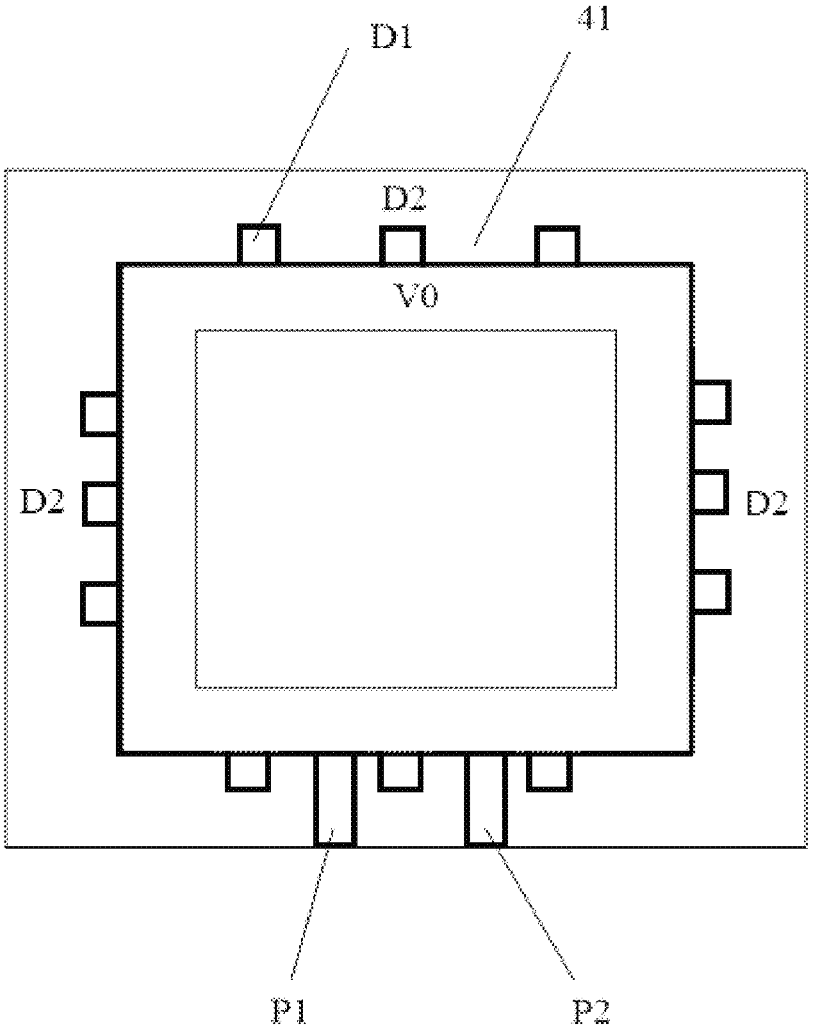
FIG. 4B is a bottom view of a transformer module provided by an embodiment of the present disclosure.
Figure 4C:
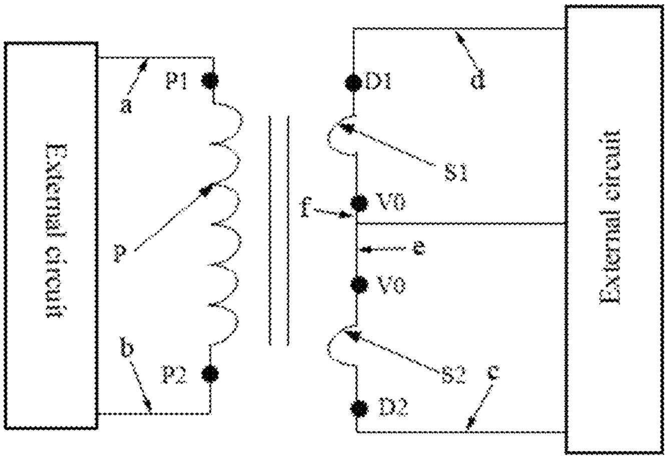
FIG. 4C is an electrical schematic diagram of each end of the transformer module shown in FIG. 4B.
Figures 3, 10B:
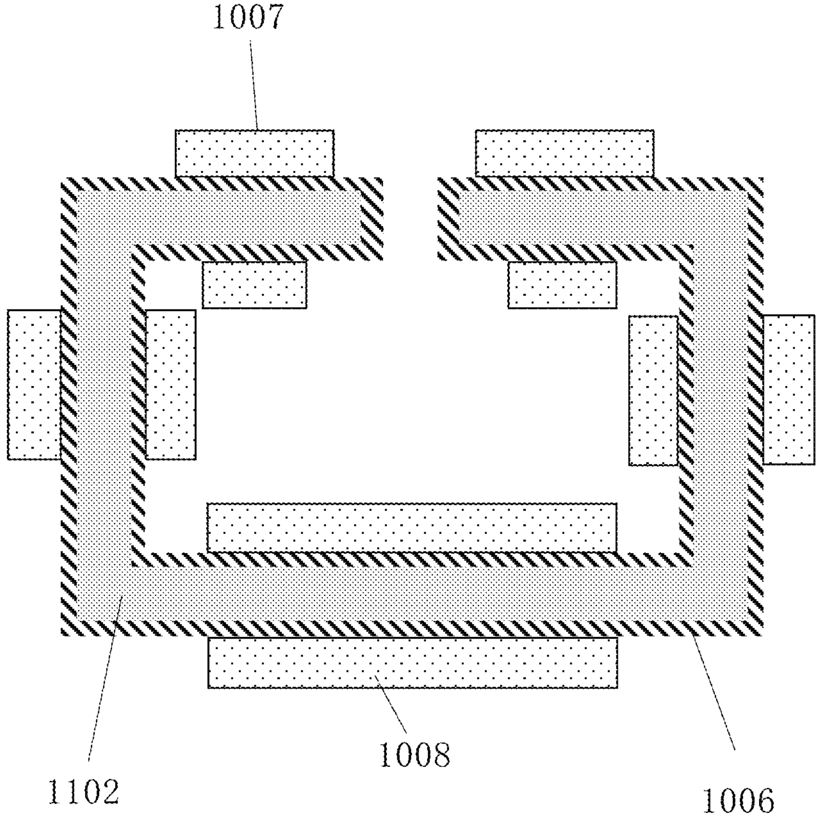
Figures 4, 10B:
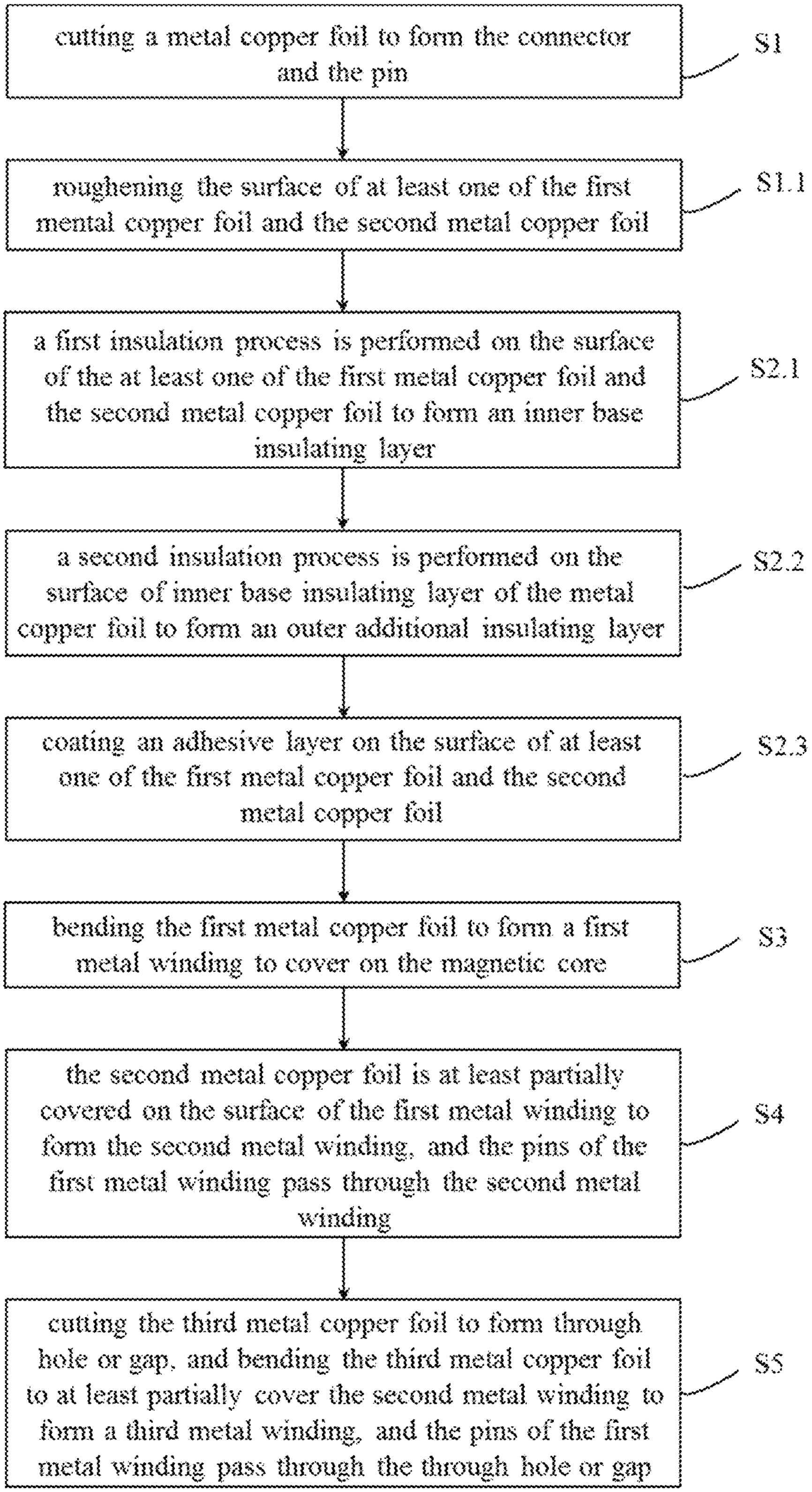
Figure 17:
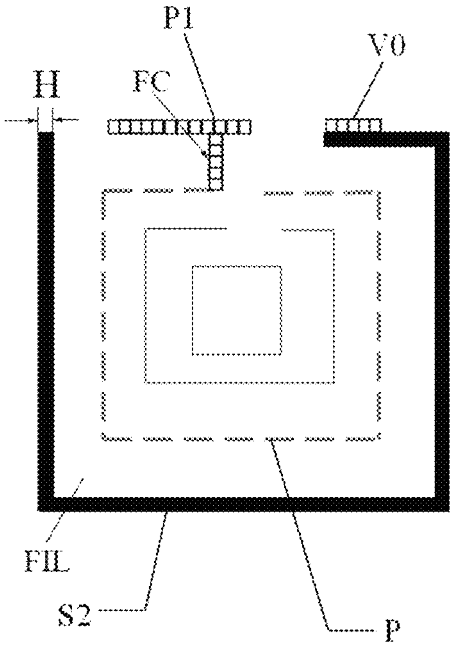
FIG. 17 is a cross-sectional view of the transformer module taken alone line BB' shown in FIG. 5 according to an embodiment of the present disclosure.
Figure 19:
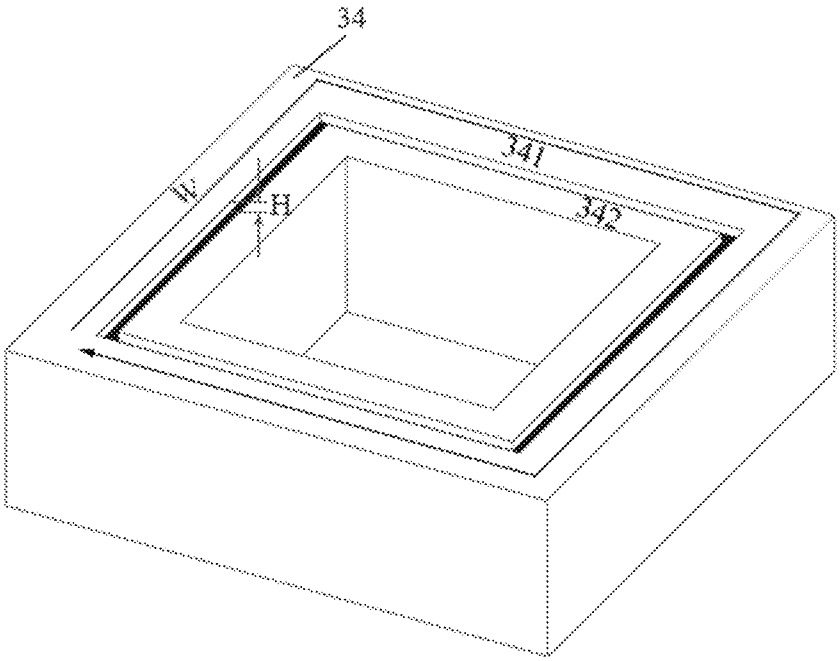
FIG. 19 is a perspective view of a transformer module of FIG. 4A according to an embodiment of the present disclosure.

FIG. 4 shows another embodiment. Specifically, FIG. 4C shows a transformer with a primary winding P and center-tapped secondary windings S1 and S2. The primary winding P has two ends a and b connected to the pins P1 and P2. One secondary winding S1 has two ends f and d connected to the pins D1 and V0 while the other secondary winding S2 has two ends c and e connected to the pins V0 and D2. S1 and S2 are connected in series on the common end which connects to the pin V0. The primary winding P and center-tapped secondary windings S1 and S2 are connected to an external circuit through ends a, b, c, d, e, and f. FIG. 4B is the bottom view of the corresponding transformer of FIG. 4C. FIG. 4A is the bottom view of the transformer with winding S1. Referring to FIGS. 4A-4C, unlike the embodiment shown in FIGS. 3A-3E, the third wiring layer is further added in this embodiment, that is, the first wiring layer, the first insulating layer, the second wiring layer, the second insulating layer and the third wiring layer are respectively disposed from the outside to the inside on the magnetic core. The first wiring layer, the second wiring layer, and the third wiring layer are respectively used to form the first metal winding S2, the second metal winding P, and the third metal winding S1 which forms a "sandwich" transformer structure S1-P-S2. Assuming that the third winding 34 has, for example, one turn, as shown in FIG. 4A, and the third winding 34 wraps four magnetic columns of the ⊔ -shaped magnetic core, and forms two ends 341 and 342 on the bottom side of the magnetic core by the process e.g. etching, cutting, or the like etc. FIG. 19 is a perspective view of a transformer module of FIG. 4A according to an embodiment of the present disclosure. In FIG. 19, the dimension of the winding parallel to the longitudinal direction of the magnetic column is W, which is represented by a rectangle-like arrow; and the thickness of the winding which is the dimension of the winding vertical to the magnetic column of the magnetic core is H, which is also shown in FIG. 17. It is noted that only the thickness of the first winding is shown in FIG. 17 and the thickness of the second winding and the third winding is omitted for simplification.

FIG. 4B shows the bottom view of the transformer with the second insulating layer, the second wiring layer, the first insulating layer, the first wiring layer, winding outside the third wiring layer in sequence. So the third winding is at least partially covered by the second insulating layer. The two ends of the third winding 34 include a first end 341 connected to the fifth pin D1 of the outermost layer through a third connector e.g. a via (not shown) for the electrical connection to an external circuit wherein pin D1 may locate on the first side (for example, the bottom surface). The second end 342 of the third winding 34 is usually connected to one end of the first wiring layer winding, and is connected to the first surface-mounted pin V0 through the fourth connector e.g. a via (not shown), which is not limited in the present disclosure. That is to say, the two ends 341, 342 pass through the second insulating layer, the second wiring layer and the first insulating layer. The first winding and the second winding are connected to the external pin in the same manner as the foregoing embodiment, and the first winding connects the first surface-mounted pin V0 and the second surface-mounted pin D2, and the second winding connects the third surface-mounted pin P1 and the fourth surface-mounted pin P2.

Specifically, a base insulating layer may be selectively attached to the surface of the magnetic core by spraying or deposition, which is used for insulation, strengthening the bonding force, and protecting the magnetic core, but the disclosure is not limited to this, and the base insulating layer may not be disposed. And a third wiring layer, for example a copper layer, may be disposed on the surface of the magnetic core or the base insulating layer by electroplating or electroless plating; and then a metal protective layer, such as a tin layer or a gold layer, may be disposed on the surface of the third wiring layer by electroplating or electroless plating; then the metal protective layer is patterned by a writing process to expose a portion of the third wiring layer to be etched; and then patterns of the third wiring layer are etched under the protection of the protective layer to form a third winding; finally, the protective layer is removed to expose the third winding, that is, the secondary winding S1. Then, the second insulating layer is attached to the third metal winding by spraying or deposition, and then a second wiring layer, e.g. a copper layer is provided on the second insulating layer by electroplating or electroless plating; then a metal protective layer, such as a tin layer or a gold layer, is electroplated or electrolessly plated on the surface of the second wiring layer; and then the metal protective layer is patterned by a writing process to expose a portion of the second wiring layer to be etched; and then patterns of the second wiring layer are etched under the protection of the metal protective layer to form a second winding; finally, the protective layer is removed to expose the second metal winding, that is, as the primary winding P. Then, the first insulating layer is attached to the second metal winding by spraying or deposition, and then a first wiring layer, e.g. a copper layer is provided on the first insulating layer by electroplating or electroless plating; then a metal protective layer, such as a tin layer or a gold layer, is electroplated or electrolessly plated on the surface of the first wiring layer; and then the metal protective layer is pattern defined by a writing process to expose a portion of the first wiring layer to be etched; and then patterns of the first wiring layer are etched under the protection of the metal protective layer to form a first winding; finally, the protective layer is removed to expose the first winding, that is, as the secondary winding S2. However, the disclosure is not limited thereto, and other winding forming processes are also applicable.

An optional method, as shown in FIG. 4B, the fifth surface-mounted pins D1 have plural pins, locating between the first surface-mounted pin V0 and the second surface-mounted pin D2. Further, the second surface-mounted pin D2 further includes a plurality of teeth 41, which are alternately arranged with the plurality of fifth surface-mounted D1 pins. In an embodiment, the plurality of teeth 41 are evenly alternately arranged with the plurality of fifth surface-mounted pins D1. The plurality of fifth surface-mounted pins and plurality of second surface-mounted pins are used to connect multiple sets of switches and help to reduce impedance and improve integration. The more even distribution the pins D1, D2 has, the more even current distribution of current the transformer has. And the smaller impedance the transformer has. In an embodiment, the surface-mounted pins may be columnar or spherical, etc., and the disclosure is not limited thereto.

Figure 5:
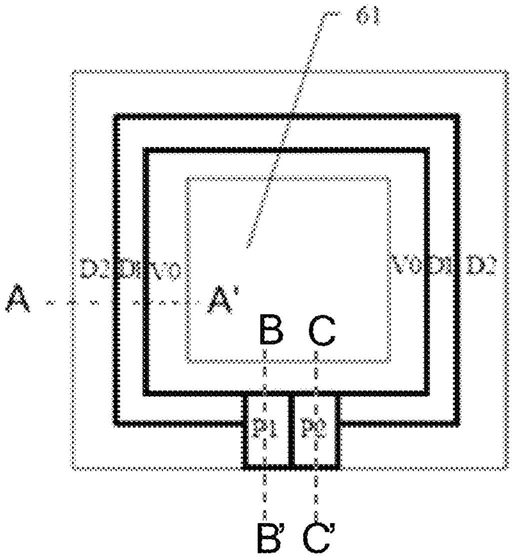
FIG. 5 is a bottom view of another transformer module provided by an embodiment of the present disclosure.

Alternatively, FIG. 5 is a bottom view of another transformer module provided by an embodiment of the present disclosure. In contrast to FIG. 4, the fifth pin D1 is located between the first pin V0 and the second pin D2. The magnetic core may include a through hole 61, the fifth pin D1 partially surrounds the through hole 61, for example, the fifth pin D1 has a C-shape. From the bottom view of the transformer module, the first pin V0 is a hollow square shaped pin surrounding the through hole 61, and the second surface-mounted pin D2 is C-shaped partially surrounding the through hole 61. However, the present disclosure is not limited thereto. By adjusting the positions of the third pin P1 and the fourth pin P2, the first, second, and fifth pins may also form other shapes such as the□ -shape (hollow square shape) surrounding the through hole. Shapes such as C-shape, hollow square-shape can increase the connection strength with external modules and are suitable for connecting multiple modules.

Embodiment 3

Figure 6A:
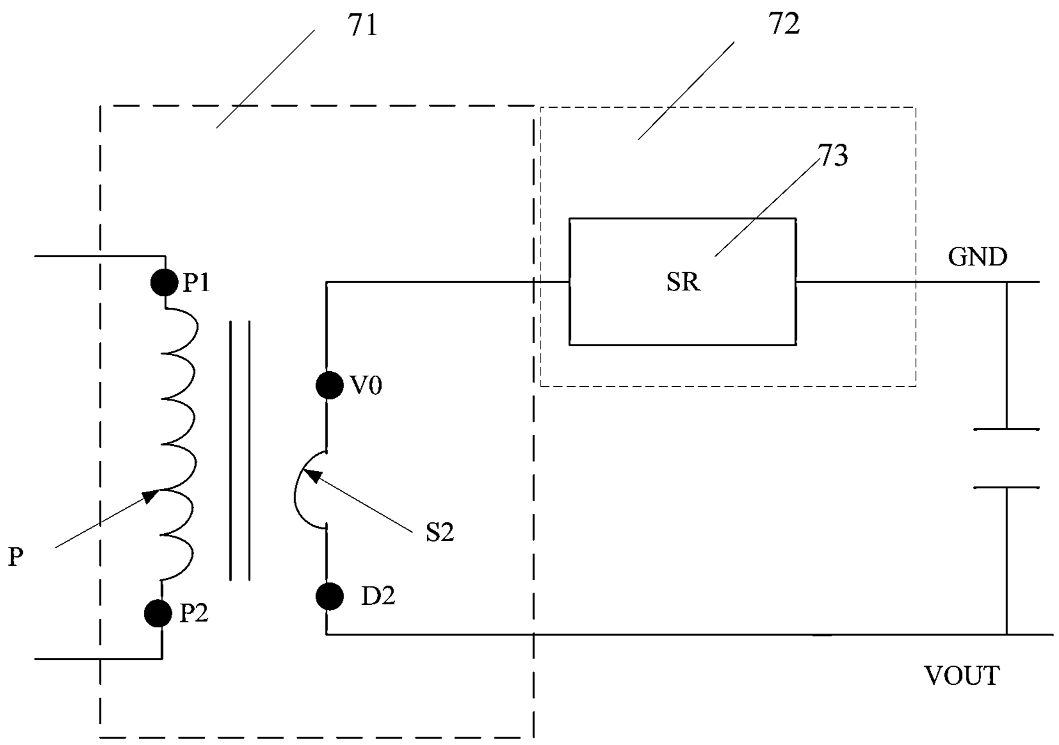
FIG. 6A and FIG. 6B are respectively electrical schematic diagrams of each end of a power module provided by an embodiment of the present disclosure.
Figure 6B:
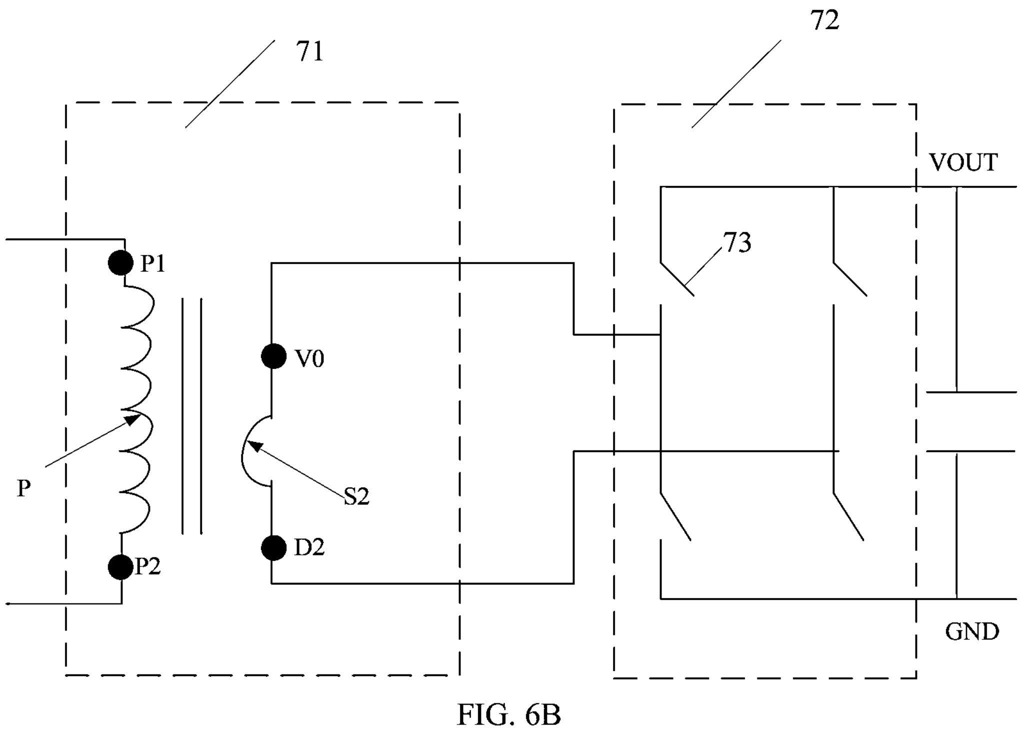
Figure 6C:
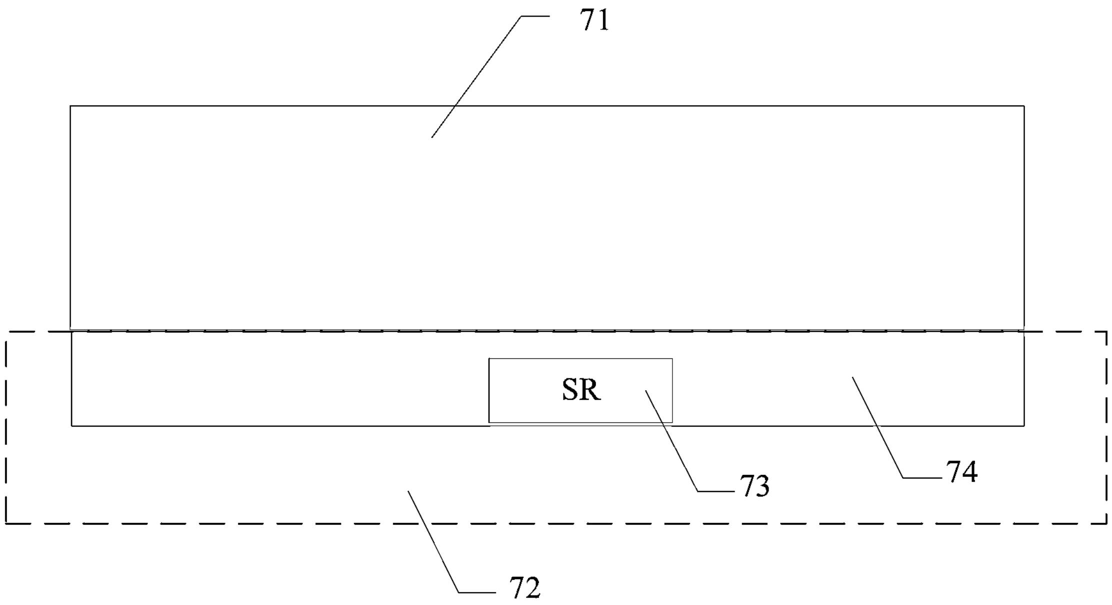
FIG. 6C and FIG. 6D are respectively cross-sectional views of a power module provided by an embodiment of the present disclosure.
Figure 6D:
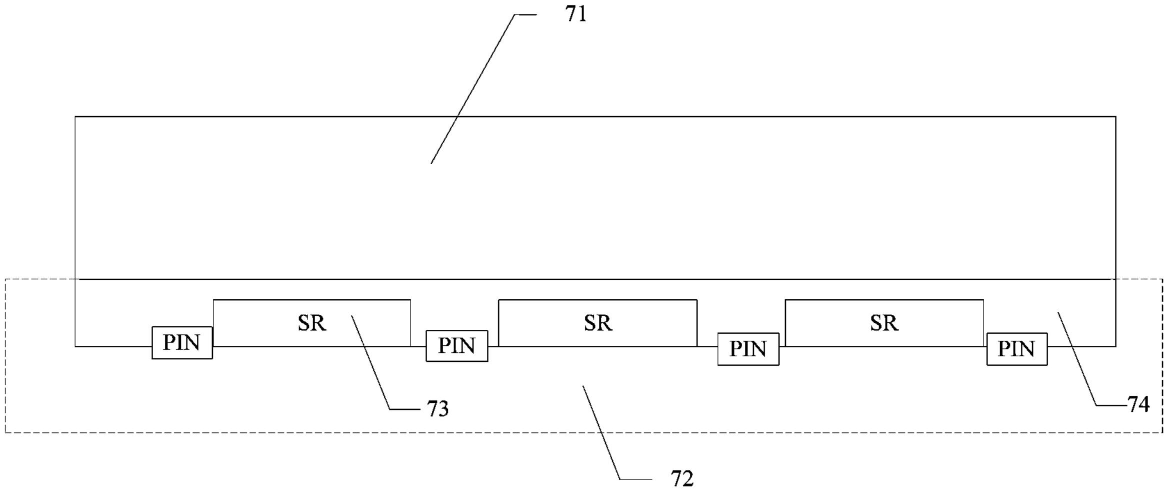

FIG. 6A and FIG. 6B are schematic diagrams of a power module provided by an embodiment of the present disclosure with corresponding ends marking on them. FIG. 6C and FIG. 6D are respectively cross-sectional views of power modules of FIG. 6A and FIG. 6B. With reference to FIG. 6A to FIG. 6D, the power module includes: a transformer module 71 as in various embodiments of the present disclosure; and a switch module 72, the switch module 72 and the first side (for example, the bottom surface having a pin) of the transformer module 71 are in contact and electrically connected to the first pin V0 and the second pin D2.

As shown in FIGS. 6A and 6C, the power switch 73 is electrical connected to the first pin V0. FIG. 6B shows that the switch module may also include at least one full bridge circuit formed by four power switches (such as MOSFETs), and the full bridge circuit is electrically connected to the first pin V0 and the second pin D2. In an embodiment, the switch module 72 may include a board 74 and at least one power switch 73 which is embedded or molded in the board 74 as shown in FIG. 6C and FIG. 6D. And the power switches may be disposed on the board 74 (not shown). According to the practical application of the circuit topology, different types of power switches can be selectively electrically connected to the first pin and/or the second pin, the present disclosure is not limited to this, and the power switch can also be connected to other pins. Take FIG. 6A as an example, SR 73 may be connected between the first pin V0 and the output pin GND or between the second pin D2 and the output pin VOUT according to different topology. Each power switch shown in the figures can be connected in parallel by multiple power switches according to the output power of the actual transformer. As shown in FIG. 6C and FIG. 6D, the power switch may be located on the lower surface of the transformer module, or the power switch may also be located on the upper surface of the transformer module, which is not limited in the present disclosure.

Wherein, the power switch can be a diode, a Metal-Oxide-Semiconductor Field-Effect Transistor (MOSFET), an Insulated Gate Bipolar Transistor (IGBT) and the like.

Figure 6E:
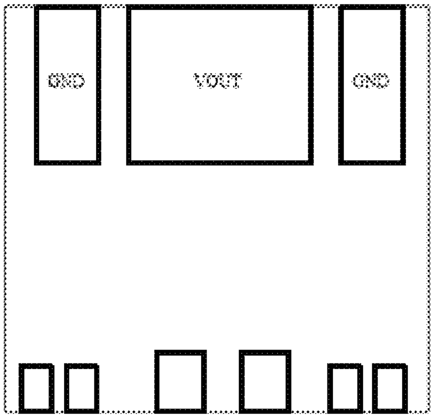
FIG. 6E is a bottom view of a switch module provided by an embodiment of the present disclosure.

Specifically, the bare die of one or more parallel power switches SR can be directly integrated into a board by an embedded process to form the switch module, but the disclosure is not limited thereto. The power switch can be placed just below the pins of the transformer module for easy connection to the pins. Referring to FIG. 3C, in this embodiment, although the numbers of the first pin V0 and the second pin D2 are both one, if the size of the power switch or the size of the external connection pin of the switch module is smaller than the size of the transformer module, a plurality of parallel SRs can be connected to the pins, and the SRs can be evenly distributed or unevenly distributed on the pins. The embodiment shown in FIG. 5 can also be similarly set. Referring to FIG. 4B, in this embodiment, the plurality of fifth pins D1 and the teeth of the plurality of second pins D2 can be used to connect a plurality of power switches. FIG. 6E is a bottom view of the switch module provided by an embodiment of the present disclosure. As shown in FIG. 6E, the lower surface of the board may form an output pin, such as VOUT, GND, and the like. Then the corresponding transformer module is welded to the board to form a power module, as shown in FIGS. 6C and 6D.

Alternatively, one or more parallel SRs are firstly welded to the surface of the board, then the switch module is formed by a molding process, the other surface of the board forms a pad corresponding to the transformer module, and the transformer module is welded on the corresponding surface of the board to form the power module.

Figure 6F:
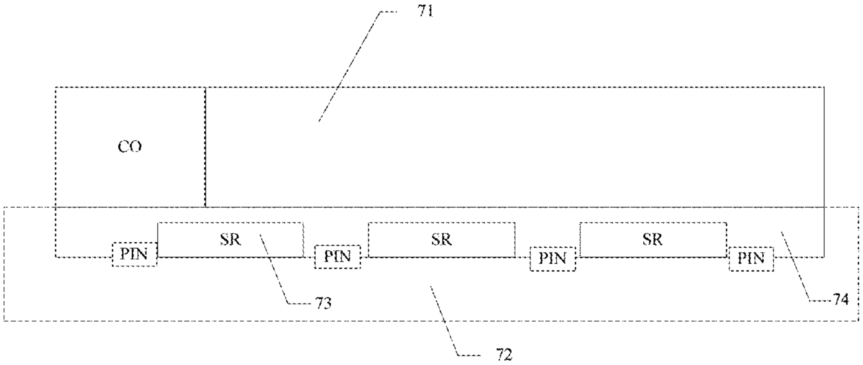
FIG. 6F is a cross-sectional view of a power module provided by an embodiment of the present disclosure.
Figure 7:
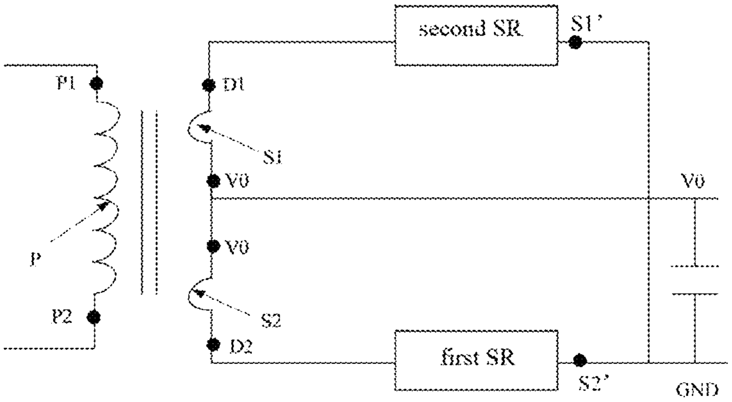
FIG. 7 is an electrical schematic diagram of each end of a power module provided by an embodiment of the present disclosure.

Further, the power module further includes a capacitor module disposed on the board and disposed adjacent to the transformer module. As shown in FIG. 6A and the like, the capacitor module can be electrically connected to the second pin D2. In another embodiment, as shown in FIG. 7, the capacitor module can be electrically connected to the first pin V0, and the disclosure is not limited thereto. The power module may further include an LLC power unit, a controller, etc., so that the power module is used as an LLC converter. Specifically, FIG. 6F is a cross-sectional view of a power module provided by an embodiment of the present disclosure, as shown in FIG. 6F, Co is the output capacitor. In FIG. 6F, Co is placed on the switch module and beside the transformer. When the core of the transformer is a square or circle shape, Co may be place inside the window of the core, e.g. the hole of the core in FIG. 3A. Furthermore, Co may be placed on the board of the switch module or even embedded inside the board of the switch module.

It should be noted that the above power module is not limited to the LLC converter, and is also applicable to any circuit including a transformer module, such as a flyback converter, a full bridge circuit, and the like.

Embodiment 4

On the basis of the embodiment 3, the present disclosure further provides a power module, wherein the power module includes a transformer module similar to the embodiment 2, and the second insulating layer and the third wiring layer are sequentially disposed on the magnetic core, and the second insulating layer is at least partially covered by the second metal winding. The transformer module further includes: a third metal winding formed in the third wiring layer winded around the magnetic core in a foil structure, wherein the third winding is at least partially covered by the second insulating layer; and a fifth pin, the fifth pin is located on a first side (e.g., a bottom surface) of the transformer module, and a first end of the third winding is electrically connected to the fifth pin D1 through the third connector, such as via, the second end of the third winding is electrically connected to the first pin V0, and the rest is not described herein.

FIG. 7 is an electrical schematic diagram of a power module provided with plurality of ends marking on it by an embodiment of the present disclosure. As shown in FIG. 7, the secondary windings S1 and S2 of the center-tapped transformer are connected to a first power switch, a second power switch and a cap respectively. And after the transformer module and the switch module are stacked, the switch module is further electrically connected to the fifth pin.

Further, as shown in FIG. 7, the power module further includes a first power switch (SR) and a second power switch (SR), wherein the first end of the first power switch is electrically connected to the second pin D2, the first end of the second power switch is electrically connected to the fifth pin D1, and the second end of the first SR and the second end of the second SR are electrically connected, but the disclosure is not limited thereto, and each of the illustrated power switches may actually be equivalently connected in parallel by a plurality of power switches depending on the power level of the device.

Further, the power module further includes a capacitor module, for example, as an LC resonant capacitor or an output capacitor, and the present disclosure is not limited thereto. Further, the capacitor module is disposed on the board and adjacent to the transformer module, and the capacitor module is electrically connected to the first pin V0, as shown in FIG. 6F, and Co is an output capacitor. In some other embodiments, the capacitor may also be located adjacent to the same side of the switch device SR on the carrier board; or the capacitor may also be embedded in the carrier board; or the capacitor may be placed in the window of the transformer, when the transformer core of FIG. 6F is a □ -shape, etc.; even if the capacitor is placed on the upper surface of the magnetic core, the power switch SR is placed on the lower surface of the magnetic core. Wherein, the power module may further include an LLC primary power unit, a controller, etc., such that the power module functions as an LLC converter.

It should be noted that the above power module is not limited to the LLC converter, and is also applicable to any circuit including a transformer module, such as a flyback converter, a full bridge circuit, and the like.

It can be seen that the power module is easy to be modular produced. First, multiple power switches SRs are integrated on one board to form multiple switch modules. Then, multiple transformer modules are surface mounted to the corresponding switch modules, thus multiple power modules with a common board come into being, wherein each power module has one switch module and one transformer module stacked on the switch module. And finally separate the power modules by e.g. cutting process, so that independent multiple power modules can be produced at one time, but the disclosure is not limited thereto.

Further, the power switches are directly connected to the plurality of output Pins of the transformer module, and the connection loss is small; the primary and secondary circuits of the transformer module are directly coupled to each other, the AC impedance of the windings is small, and the AC loss is small, but the present disclosure is not limited to this.

In some embodiments including embodiment 1 to embodiment 4, the correspondence of the surface-mounted pins is (but not limited to):

- the first pin corresponds to V0, and it can be seen from FIGS. 3E, 4C, 6A, 6B, and 7, it can correspond to the first end of the first metal winding S2 or the second end of the third metal winding S1, etc. According to different topologies, the first pin may be used as the output pin of the module in FIG. 7 or it may be used to connect the switch as shown in FIGS. 6A and 6B.
- the second pin corresponds to D2, and it can be seen from FIGS. 3E, 4C, 6A, 6B, and 7, it can correspond to the second end of the first metal winding S2. According to different topologies, the first pin may be used for connection with the power switch, such as shown in FIG. 6B and FIG. 7, or it may be used for connection with the secondary grounding, as shown in FIG. 6A.
- the third pin corresponds to P1, and the fourth pin corresponds to P2, and they can respectively correspond to two ends of the second metal winding P.
- the fifth pin corresponds to D1, it can be seen from the FIGS. 4C, and 7 that it can correspond to the first end of the third metal winding (which may be used as the secondary winding S1), and can be used for the connection with the power switch.

However, in some other embodiments of the present disclosure, such as in the embodiment 5 to the embodiment 7, for the convenience of description, the electrical connection points corresponding to the pins are not the same as the corresponding electrical connection points in the foregoing embodiments, the present disclosure is not limited to this.

Embodiment 5

Figure 8:
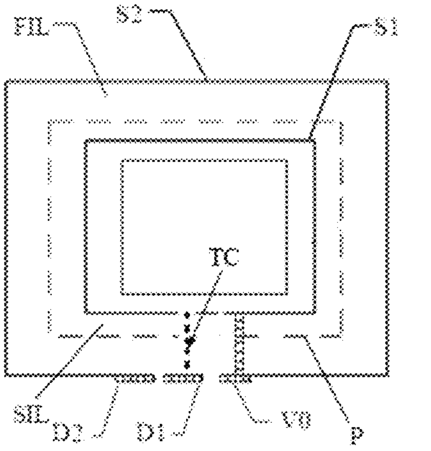
FIG. 8 is a cross-sectional view of the transformer module taken along line AA' shown in FIG. 5 according to an embodiment of the present disclosure.
Figure 18:
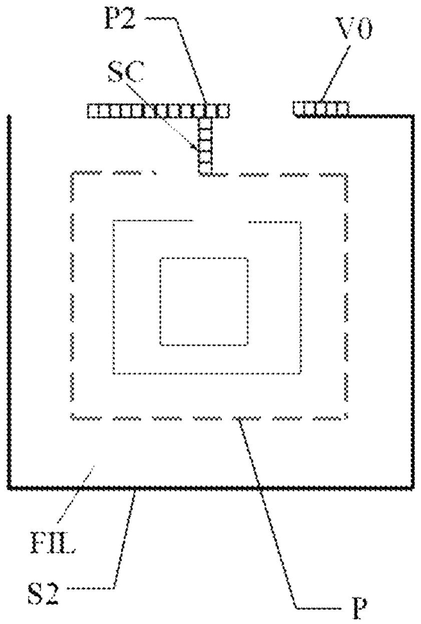
FIG. 18 is a cross-sectional view of the transformer module taken alone line CC' shown in FIG. 5 according to an embodiment of the present disclosure.

In the above embodiments, respective windings of the transformer may be located in the same wiring layer, but the disclosure is not limited thereto. FIG. 8 is a cross-sectional view of the transformer module of FIG. 5 taken along line AA', from which it can be seen that the windings are respectively located in the first, second, and third wiring layers, wherein the first, second and third wiring layers are arranged in order from the outside to the inside, and the first insulating layer (FIL) is between the first wiring layer and the second wiring layer, and the second insulating layer (SIL) is between the second wiring and the third wiring layer. In FIG. 8, the connecting via between the first end of the winding S1 in the third wiring layer and the second pin D1 is represented by a dash line while the via between the second end of the winding S1 and V0 is represented by a shadow area, because the via connecting the first end of the winding and D1 is not in the cross section along AA'. And FIG. 8 shows that one winding is substantially on one wiring layer. Similarly, FIG. 17 is a cross-sectional view of the transformer module taken alone line BB' shown in FIG. 5 according to an embodiment of the present disclosure, and FIG. 18 is a cross-sectional view of the transformer module taken alone line CC' shown in FIG. 5 according to an embodiment of the present disclosure. In FIG. 17, the connecting via FC between the first end of the winding P in the second wiring layer and the third pin P1 is represented by shadow area, because the via FC connecting the first end of the winding P and P1 is in the cross section along BB'. In FIG. 18, the connecting via SC between the second end of the winding P and the fourth pin P2 is represented by shadow area, because the via SC connecting the second end of the winding P and P2 is in the cross section along CC'.

Figure 9A:
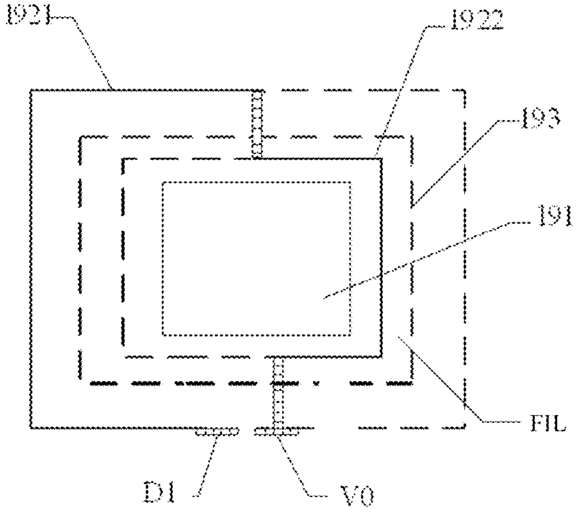
FIG. 9A is a cross-sectional view of a transformer winding in an embodiment of the present disclosure.
Figure 9B:
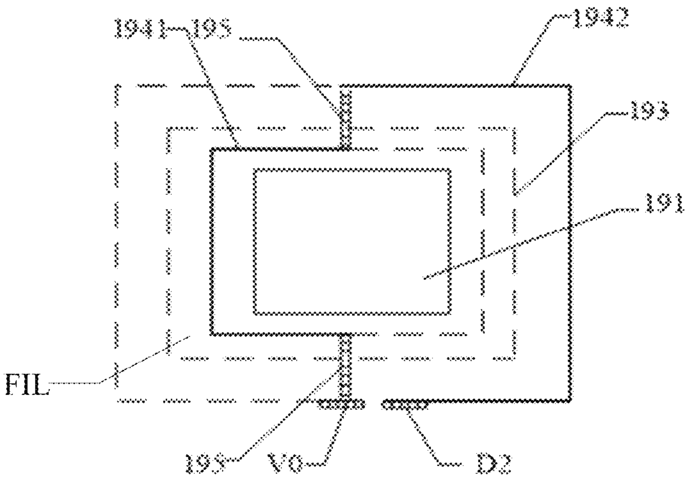
FIG. 9B is a cross-sectional view of a transformer winding in an embodiment of the present disclosure.

In practice, the windings can also be placed in a staggered manner, that is to say that different parts of the same winding can be located in different wiring layers, for example in two wiring layers. A cross-sectional view of such a winding arrangement is shown in FIGS. 9A and 9B. As shown in FIGS. 9A and 9B, 191 is a magnetic core; a first metal winding wound around the magnetic core 191 in a foil structure includes a first winding segment 1922 formed in the first wiring layer and a second winding segment 1921 formed in the second wiring layer, the first end of the first winding segment is electrically connected to the first end of the second winding segment through a via, and the second end of the first winding segment is electrically connected to the first pin V0 through a via, the second end of the second winding segment is connected to the second pin D1; the second metal winding also winds around the magnetic core 191 in a foil structure, and includes a third winding segment 1941 disposed on the first wiring layer and a fourth winding segment 1942 formed in the second wiring layer, the first end of the third winding segment is connected to the first end of the fourth winding segment through a via, and the second end of the fourth winding segment forms a third pin D2. As shown in the figure, the second end of the third winding segment is connected to the first pin V0 through a via. Thus, the first and second windings form a connection structure of the transformer secondary windings S1, S2 as shown in FIG. 7. The winding P of the transformer in FIG. 7 is the third metal winding 193 on the third wiring layer in FIGS. 9A-9B, and the third wiring layer and the second insulating layer may be sequentially located between the first insulating layer FIL and the second wiring layer. The secondary windings S1, S2 in FIG. 7 are arranged by a staggered arrangement method, which greatly improves the symmetry between the two windings compared to the arrangement mode of the same winding being located in the same winding layer as shown in the FIG. 8, and the current sharing effect of the current flowing through the first SR, the second SR during the working process of the circuit is significantly improved. In addition to the winding of FIG. 7, this way of staggered layer arrangement can be used in the winding of FIG. 6, that is to say, and the first and second metal windings, such as winding P and winding S2 in FIG. 6 may also become the windings lay on different wiring layer just as the windings shown in FIG. 9A, 9B.

Figure 9C:
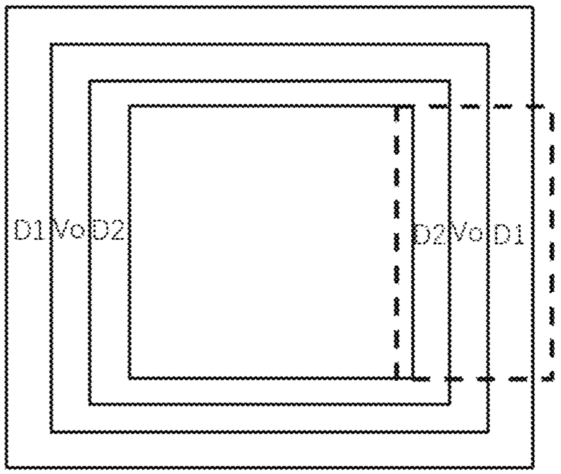
FIG. 9C is a bottom view of a transformer in an embodiment of the present disclosure.
Figure 9D:
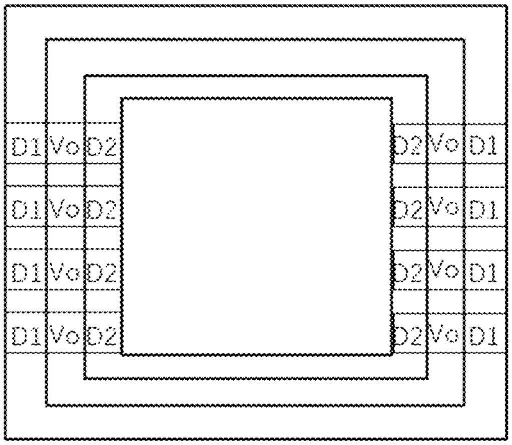
FIG. 9D is a bottom view of a transformer in an embodiment of the present disclosure.

The design of the pins can be similar to other embodiments in the present disclosure, for example, there are a plurality of third pins D2, the second pin D1 includes a plurality of teeth, and the plurality of teeth and the plurality of third pins D2 are alternately arranged; or the numbers of the second and third pins are both plural, and the plurality of second pins and the plurality of third pins are alternately arranged and so on, as shown in FIG. 9D. FIG. 9C is a bottom view of the transformer in an embodiment of the present application, including a first pin V0, a second pin D1, and a third pin D2, wherein the first pin V0 is located between the second pin D1 and the third pin D2, the length of each pin is almost equal to the average length of the winding; the first, second and third pins can be either a □ -shape or a plurality of pins being distributed on a part of the windings as shown in FIG. 9D. And the plurality of pins are symmetrically arranged, the present application is not limited to this.

Figure 9E:
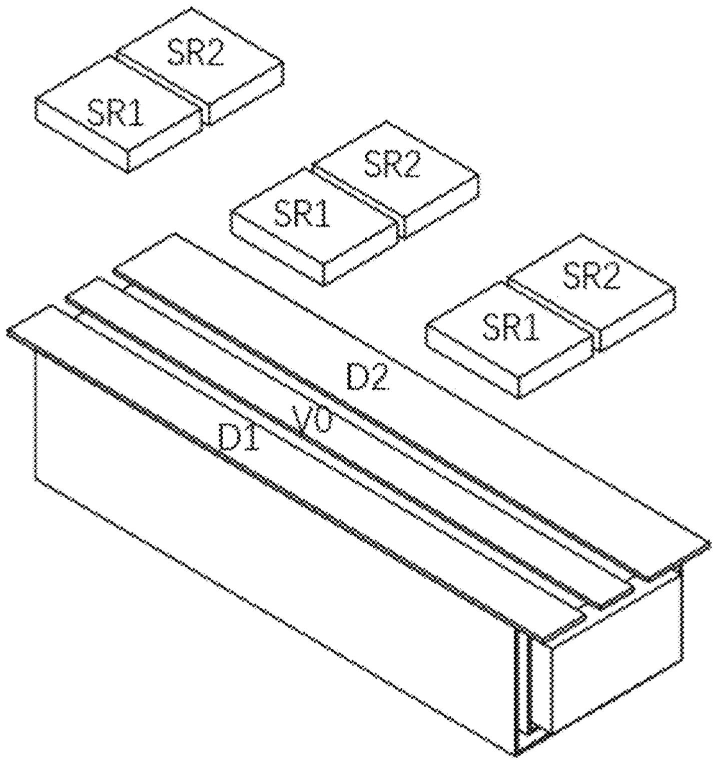
FIG. 9E is a schematic view of a portion of a transformer taken along the dashed line in FIG. 9C and the switch modules disposed thereon.

The corresponding power module may include a switch module, and the switch module is in contact with the first side of the transformer module. The switch module can include a board and at least one power switch. Similar to FIG. 7, the switch module includes a plurality of first SRs and a plurality of second SRs; a first end of the first SR is connected to the first pin D1, and a first end of the second SR is connected to the third pin D2, a second end of the first SR is electrically connected to a second end of the second SR. According to different pins of the transformer, the plurality of first SRs (i.e., SR1 in FIG. 9E) and the plurality of second SRs (i.e., SR2 in 9E) can be separated into two rows as shown in FIG. 9E. FIG. 9E is a schematic illustration of a portion of the transformer and the switching elements disposed thereon, taken along the dashed line in FIG. 9C. The portion of the transformer module includes three pins D1, D2 and V0. The pin V0 is located between D1 and D2. There is a switch module on the transformer module, and the switch module includes a plurality of SR1*s* and a plurality of SR2*s*. The plurality of SR1*s* and the plurality of SR2*s* are separated into two rows. The switch module is in contact with one side of the transformer. In addition, the power switches can also be arranged in the same row, wherein SR1 and SR2 are arranged in a staggered manner, and the present application is not limited thereto. Of course, the switch module can also include a carrier board, and the switch can be placed on the carrier board or embedded in the carrier board.

Figure 9F:
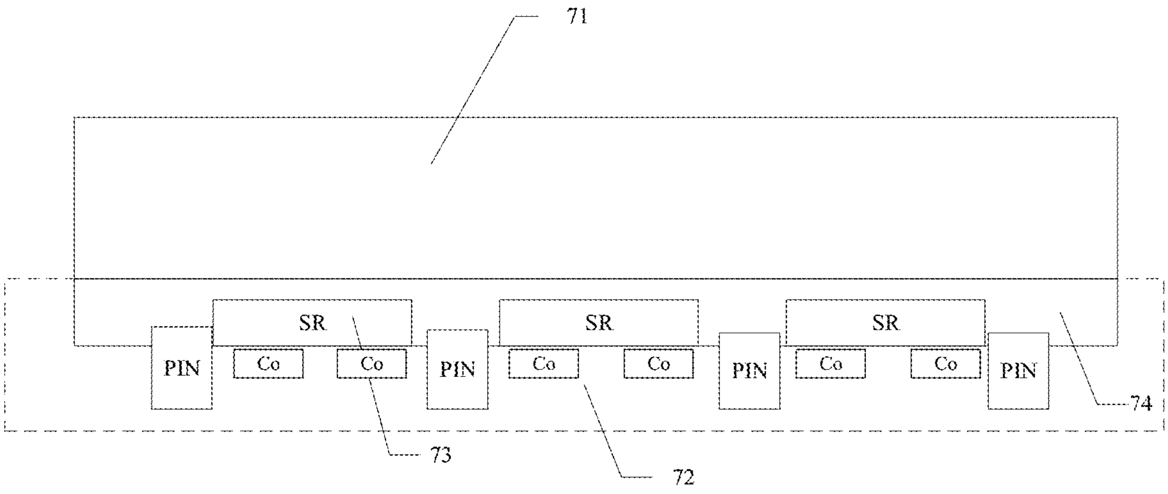
FIG. 9F is a cross-sectional view of a power module in an embodiment of the present disclosure.

Further, the power module may further include a capacitor module disposed on the board and disposed adjacent to the transformer module, and the capacitor module is electrically connected to the first pin or the second pin. The present disclosure is not limited to this. For example, the capacitor may be located below the carrier board, as shown in FIG. 9F, the capacitor Co is located below the power switch. And the capacitor Co can also be buried in the carrier board or placed on the other side of the transformer opposite the switch module, such as the upper side of the transformer module in FIG. 9F; And the capacitor Co can also be placed in the window of the magnetic core. In short, the location of the capacitor module is varied.

Figure 11A:
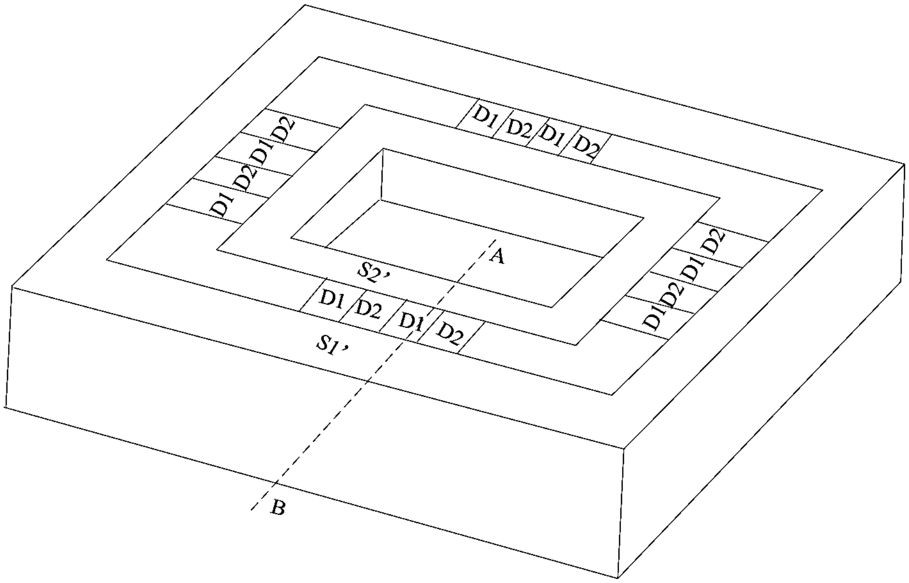
FIG. 11A and FIG. 11B are respectively structural schematic diagrams of a transformer module provided by an embodiment of the present disclosure.
Figure 11B:
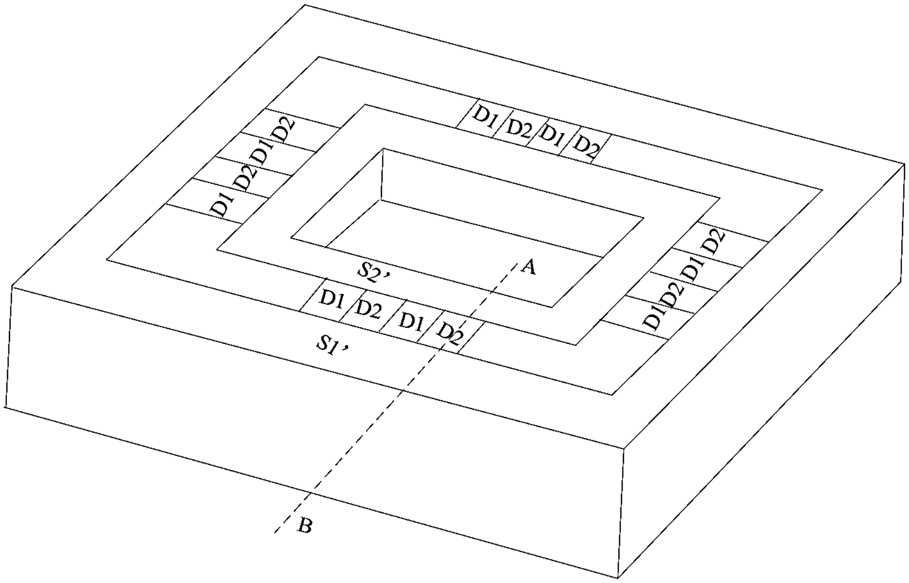

In the circuit diagram shown, for example, in FIG. 7, if the secondary windings S1 and/or S2 are separately segment formed to lead the connection ends on different sides of the transformer module, the positions of the first SR and/or the second SR are not necessary limited to the bottom surface of the transformer module, but are electrically connected in series in the corresponding metal windings by pins S1', D1, and/or S2', D2 in FIGS. 11A and 11B, devices may be flexibly disposed on multiple surfaces, which is beneficial to optimize the spatial distribution. This portion will be further described in Embodiments 6 to 8.

Embodiment 6

In the previously described embodiment, the windings of the transformer are formed by electroplating, and the pins are led out through via holes, but the disclosure is not limited thereto. As shown in FIG. 8, the winding of the transformer is a winding layer formed by electroplating or electroless plating, and the pins D1 and V0 are connected to the inner layer winding through via holes, but the disclosure is not limited thereto.

In fact, the winding of the transformer can also be formed by metal foil in a foil structure, such as copper foil. FIG. 10A is a cross-sectional view of a transformer in an embodiment of the present application. As described in the embodiment 2, the transformer module includes a first metal winding 1104, a second metal winding 1103, and a third metal winding 1102 from the outside to the inside. The initial insulating layer is located between the third metal winding and the magnetic core, and the second insulating layer is located between the third and second metal windings, and the first insulating layer is located between the second and first metal windings. Wherein the second metal winding 1103 can be used as the primary winding P, the third wiring layer metal winding 1102 can be used as the secondary winding S1, and the first wiring layer metal winding 1104 can be used as the secondary winding S2 to form the "sandwich" structure of the secondary windings sandwiching the primary winding. The third metal winding 1102 is a whole copper layer covering the magnetic core column 1101, so the magnetic core column 1101 is at least partially covered by the initial insulating layer and the third metal winding 1102, and similarly, the third metal winding 1102 is also at least partially covered by the second insulating layer and a second metal winding 1103, and the second metal winding 1103 is at least partially covered by the first insulating layer and the first metal winding 1104.

Similar to the embodiment 2, the third metal winding 1102 includes two ends, which are a first end and a second end, wherein the first end is connected to the fifth pin of the outermost layer, for example, the pin D1, for electrical connection to the outside. The second end of the third metal winding 1102 is typically connected to one end of the first metal winding 1104 and is commonly connected to the first pin of the outermost layer, such as pin V0. The first and second ends of the third winding pass through the second insulating layer, the second winding layer, the first insulating layer and the first winding layer. Different from the embodiment 2, the first end of the third metal winding 1102 and the second end of the third metal winding 1102 are not led out by via holes. FIG. 10B-FIG. 10F illustrate one approach of making metal winding using one-piece metal foil.

First, a whole piece of metal foil, such as a copper foil, is cut into a structure as shown in FIG. 10B (i.e., an expansion view of the third metal winding). A "⊥"-shape structure as shown in the figure is cut on the two parallel sides of the copper foil, and the structure is used to form the pins 1001, 1002 of the winding; then, the copper foil is folded according to the dot dash lines in the figure. The folded shape is as shown in FIG. 10C. Then, a long strip of copper foil as the second metal winding of the transformer is used to wind around the surface of the third metal winding, and the respective erected pins 1001, 1002 of the third metal winding are avoided during the winding process, as shown in FIG. 10D; finally, a first metal winding is fabricated using a process similar to that of fabricating the third metal winding. A whole piece of copper foil is cut and folded into a first metal winding as shown in FIG. 10E, and holes 1003 corresponding to the pins 1001, 1002 of the third metal winding are cut at one end of the first metal winding to let the pins of the third metal winding protrude from the holes (in the figure, there are two holes 1003 for the pins 1001, 1002 passing through, in fact, the two holes can be opened into one hole); finally, an insulation treatment is performed on the pin of the first end of the third metal winding, and then is bended and then lays on the surface of the first metal winding to form a fifth pin D1, the pin of the second end of the third wiring layer metal winding is bended and then lays on the surface of the first wiring layer metal winding for connecting to form a first pin V0, as shown in FIG. 10F to FIG. 10G.

In some embodiments, there may be a plurality of first, fifth, and second pins, and the plurality of first pins V0 are located between the fifth pins D1 and the second pins D2, and the first, second, and fifth pins are separately arranged in a row, as shown in FIG. 10G, and the application is not limited thereto.

Taking the insulation of the third metal winding 1102 as an example. The insulation requirement of the third metal winding includes an initial insulating layer on the inner side and a second insulating layer on the outer side thereof. The initial insulating layer is used for insulation from the magnetic core column 1101, and the second insulating layer is used for insulation from the second metal winding 1103. The thickness requirement of the insulating layer depends on the interlayer withstand voltage and the interlayer distributed capacitance. For example, in this case, the thickness of the insulating layer is required to be 70 μm. In addition, the insulating layer shall be windable, to avoid peeling from the metal layer during bending.

Figure 1A:
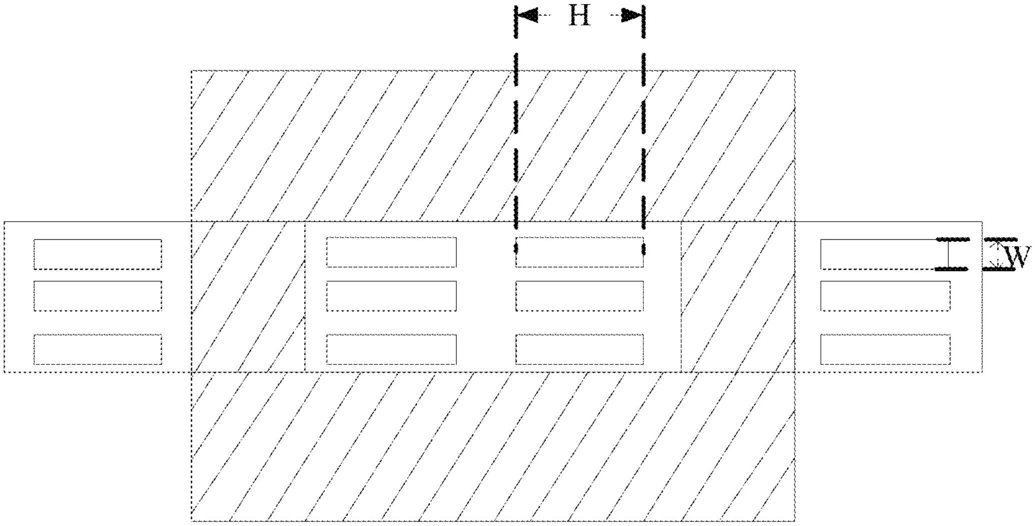
FIG. 1A (prior art)
FIG. 1A is a side cross-sectional view of a transformer using a multi-layer PCB provided by the prior art.
Figure 1B:
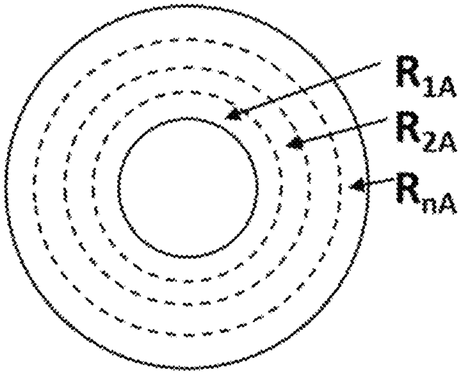
FIG. 1B is a top view of windings of the transformer using a multi-layer PCB of the FIG. 1A.
Figure 2:
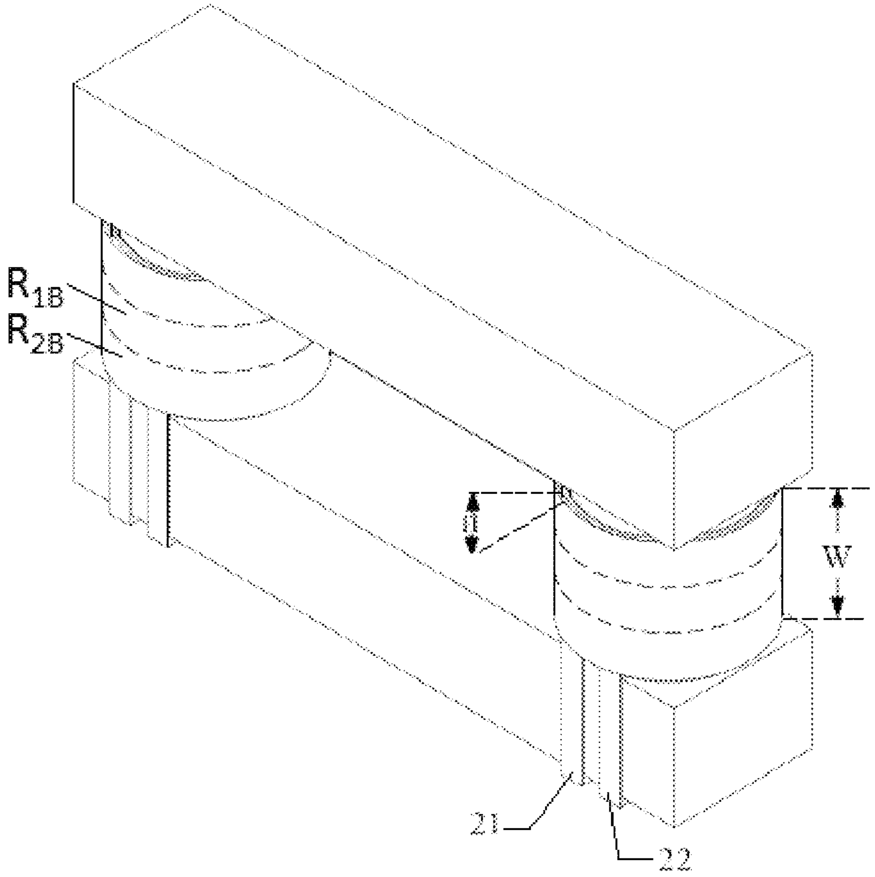
FIG. 2 (prior art)
FIG. 2 is a schematic structural view of another transformer module provided by the prior art.

In response to these requirements, and how to effectively process insulating layers between different metal wiring layers and between a wiring layer and a magnetic core column, the present application provides a new method of manufacturing an insulating layer. In the first step, a surface roughening treatment is performed on the cut metal copper, such as the third metal winding shown in FIG. 10B, including mechanical grinding or chemical roughening and browning, in which brown oxidation treatment is optimal. The purpose of surface roughening is to increase the contact surface area between the metal layer and the insulating material, thereby increasing the adhesion of the insulating material, and ensuring that delamination and peeling between the metal layer and the insulating material do not occur during subsequent bending. In the second step, the base insulating layer 1006 by the first insulating process is formed on the metal layer 1102 after the surface roughening, as shown in FIG. 10B-1. Insulation modes include electro-deposition, spraying or printing etc. Among them, the electro-deposition mode is preferred, which has the lowest requirement on the shape of the metal layer, and is more reliable for the insulation of some parts that are difficult to process, such as the corners of the metal layer, and the adhesion performance is also better. For example, the electro-deposition can be acrylic electric coating, which is composed of polyacrylic resin and polyurethane hardener. The portion 1007 where the connecters and pins are required can be avoided by covering and shielding in advance. In the third step, the additional insulating layer 1006 by the second insulating process is formed after the base insulating layer, as shown in FIG. 10B-2. The thickness of the insulating layer that can be made by the mode of electro-deposition is relatively limited, and typically, the thickness is between 0.1 and 30 μm. Therefore, when the thickness of the insulating layer is required to be greater than 30 μm, an additional insulating layer may be required. The additional insulating layer may be formed by, for example, providing an insulating glue 1008, as shown in FIG. 10B-2. Wherein, the additional insulating layer is not limited to insulating glue, and may also be fabricated by a photoresist film, local dispensing, and the like. In order to avoid cracking of the insulating layer while bending the metal layer, partial insulating layer may be performed as shown in FIG. 10B-2 and FIG. 10B-3. FIG. 10B-2 is a schematic cross-sectional view of the metal layer before being bent, and FIG. 10B-3 is a schematic cross-sectional view of the metal layer after being bent. As shown in the FIG. 10B-3, there is no insulating material in the corner portion that need to be bent. The second insulation processing increases the total thickness of the insulating layer. Wherein, this step is not essential. In the case where the thickness requirement is not high, the base insulating layer may meet the requirements. Finally, in an embodiment, an adhesive layer may be coated after the insulating layer to achieve bonding and fixing between the plurality of metal wiring layers.

The manufacturing process of a metal winding is summarized as shown in FIG. 10B-4. Step S1, cutting a metal copper foil to form the connector and the pin; step S1.1: roughening the surface of at least one of the first mental copper foil and the second metal copper foil; step S2.1: a first insulation processing is performed on the surface of the at least one of the first metal copper foil and the second metal copper foil to form an inner base insulating layer; step S2.2: a second insulation processing is performed on the surface of inner base insulating layer of the metal copper foil to form an outer additional insulating layer; step S2.3: coating an adhesive layer on the surface of at least one of the first metal copper foil and the second metal copper foil; step S3: bending the first metal copper foil to form a first metal winding to cover on the magnetic core. Step S4: the second metal copper foil is at least partially covered on the surface of the first metal winding to form the second metal winding, and the pins of the first metal winding pass through the second metal winding. Step S5: cutting the third metal copper foil to form through hole or gap, and bending the third metal copper foil to at least partially cover the second metal winding to form a third metal winding, and the pins of the first metal winding pass through the through hole or gap.

Wherein, step S1.1, step S2.2, and step S2.3 are all optional steps. It should be noted that the present application does not limit the order before the foregoing steps. For example, step S2.1 and step S2.2 may be performed before step S1, or may be performed after step S1. In some embodiments, the second metal copper foil in step S4 may be a long strip copper foil, which is wound on the surface of the first metal winding as the second metal winding, and forming a through hole or a gap during the winding process to let the pins of the first metal winding pass through.

The corresponding power module can be referred to the power module in embodiment 5, and details are not described herein again.

Figure 12A:
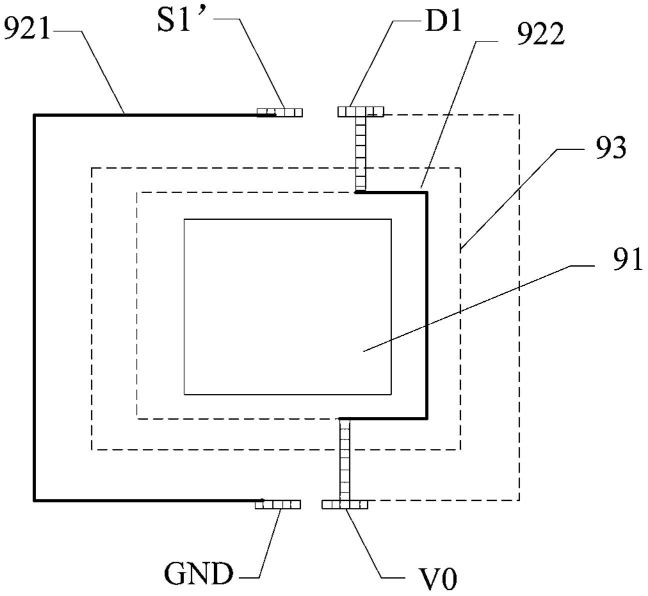
FIG. 12A is a cross-sectional view of a transformer module taken along line AB of FIG. 11A provided by an embodiment of the present disclosure.
Figure 12B:
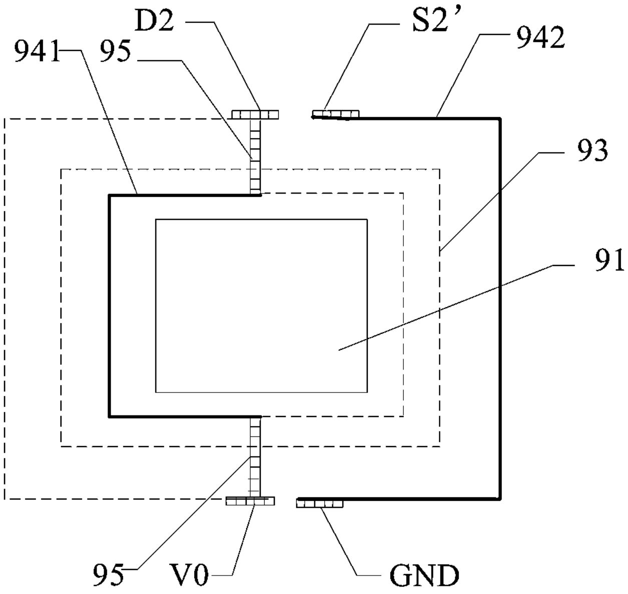
FIG. 12B is a cross-sectional view of a transformer module taken along line AB of FIG. 11B provided by an embodiment of the present disclosure.

In the circuit diagram shown, for example, in FIG. 7, if the secondary windings S1 and/or S2 are separately segmented to lead out the connection ends on different sides of the transformer module, the positions of the first SR and/or the second SR are not necessarily limited to the bottom surface of the transformer module, but they are electrically connected in series in the corresponding metal windings by the pins S1', D1, and/or S2', D2 in FIG. 12A and FIG. 12B, which can be flexibly arranged on multiple surfaces. It is beneficial to optimize the spatial distribution. This section will be further described in embodiment 7 to embodiment 9.

Embodiment 7

FIG. 11A and FIG. 11B are respectively structural schematic diagrams of the transformer module provided by an embodiment of the present disclosure. FIG. 12A is a cross-sectional view of the transformer module provided by an embodiment of the present disclosure taken along the line AB shown in FIG. 11A. FIG. 12B is a cross-sectional view of a transformer module provided by an embodiment of the present disclosure taken along the line AB of FIG. 11B, and the broken lines in FIG. 12A and FIG. 12B indicate the omitted portion. Specifically, with reference to FIG. 11A and FIG. 12A, the transformer module includes:

a magnetic core 91, the magnetic core 91 is provided with a first wiring layer, a first insulating layer, a second wiring layer, a second insulating layer and a third wiring layer in order from the inside to the outside; and a first metal winding winds around the magnetic core 91 in a foil structure, and includes a first winding segment 922 formed in the first wiring layer and a second winding segment 921 formed in the second wiring layer, the first end of the first winding segment 922 is electrically connected to the first pin D1 through a via. The second end of the first winding segment 922 is electrically connected to the second pin V0 through a via, and the first end of the second winding segment 921 forms a third pin S1', the first pin D1 and the third pin S1' are both located on the first side of the transformer module, the second end of the second winding segment 921 forms a fourth pin GND, and the second pin V0 and the fourth pin GND are both located on the second side of the transformer module. When a corresponding electronic device, such as a switching element, is electrically connected to the first pin D1 and the third pin S1', the first winding segment 922 formed in the first wiring layer and the second winding segments 921 formed in the second wiring layer are electrically connected in series. The third metal winding 93 is formed in the third wiring layer and winds around the magnetic core 91 in a foil structure. In an application embodiment, the third metal winding 93 can be used as the primary winding P, and the first metal winding can be used as the secondary winding S1, for example corresponding to FIG. 3E.

In some embodiments, with reference to FIG. 11B and FIG. 12B, the transformer module further includes:

a second metal winding winds around the magnetic core 91 in a foil structure includes a third winding segment 941 formed in the first wiring layer and a fourth winding segment 942 formed in the second wiring layer, and the first end of the third winding segment 941 is connected to the fifth pin D2 through the via 95, the second end of the third winding segment 941 is electrically connected to the second pin V0, and the first end of the fourth winding segment 942 forms a sixth pin S2', the second end of the fourth winding 942 is electrically connected to the fourth pin GND, and the fifth pin D2 and the sixth pin ST are both located on the first side of the transformer module. In an application embodiment, the third metal winding 93 can be used as the primary winding P, the first metal winding can be used as the secondary winding S1, and the second metal winding can be used as the secondary winding S2, for example corresponding to FIG. 4C.

In some embodiments, after the corresponding electronic device, such as a switch, is electrically connected to the fifth pin D2 and the sixth pin S2', the third winding segment 941 formed in the first wiring layer and the fourth winding segments 942 formed in the second wiring layer are electrically connected in series.

In some embodiments, the transformer module may include the first metal winding and the second metal winding, and the third metal winding as well as the corresponding wiring layer and the insulating layer between the adjacent layers are not highlighted, and the first winding and the second winding are respectively used as the primary winding P and the secondary winding S1 of the transformer module, for example, corresponding to FIG. 3E. This disclosure is not limited to this.

In some embodiments, the vias may be located at about middle points of the first metal winding 92 and the second metal winding 91. For example, assuming that both the first winding and the second winding have one turn, the first winding segment 922, the second winding segment 921, the third winding segment 941 and the fourth winding segment 942 are about half turn winding around the magnetic core 91, but the present disclosure is not limited thereto, and the number of turns of the first metal winding and the third metal winding are not limited to one.

In some embodiments, the first side and the second side of the transformer module are opposite sides. For example, the first side of the transformer module may be the upper surface of the transformer module, and the second side of the transformer module may be the lower surface of the transformer module. Alternatively, the first side of the transformer module can be one side of the transformer module and the second side of the transformer module can be a different side of the transformer module. The specific positions of the first side and the second side are not limited in the present disclosure.

In some embodiments, the magnetic core is ⊔ -shaped, ring-shaped, I-shaped or C-shaped.

In some embodiments, the number of turns of the first metal winding is one turn, the number of turns of the third metal winding is a plurality of turns to form a spiral type winding around the magnetic core, and the number of turns of the second metal winding is one turn.

Figure 13A:
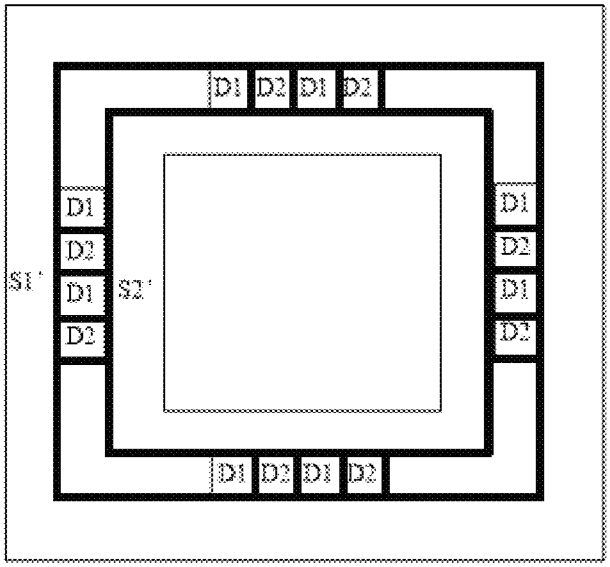
FIG. 13A is a top view of a transformer module provided by an embodiment of the present disclosure.

The distribution of the first pin D1, the fifth pin D2, the third pin S1', and the sixth pin S2' of the transformer module will be described below:

As an alternative, FIG. 13A is a top view of a transformer module provided by an embodiment of the present disclosure. As shown in FIG. 13A, the number of the first pin D1 is plural, and the number of the fifth pin D2 is plural. And the plurality of first pins D1 and fifth pins D2 are alternately arranged, and the plurality of first pins D1 and the plurality of fifth pins D2 are located between the third pin S1' and the sixth pin S2'.

Figure 13B:
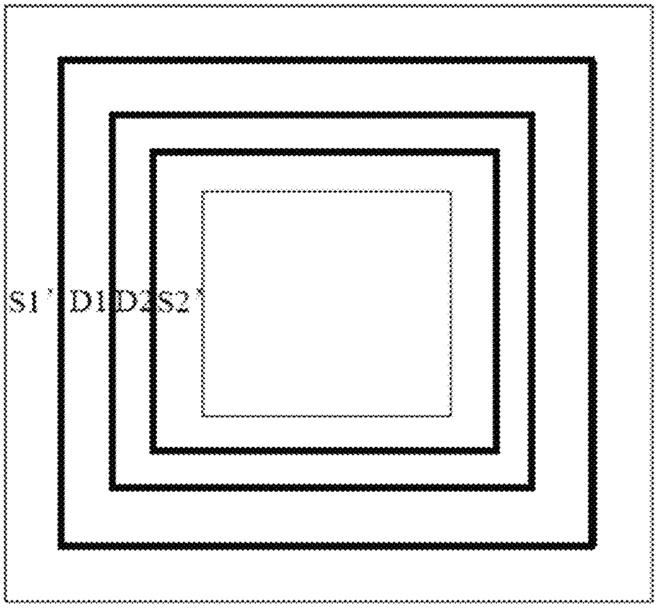
FIG. 13B is a top view of a transformer module provided by another embodiment of the present disclosure.

As another alternative, FIG. 13B is a top view of a transformer module provided by another embodiment of the present disclosure. As shown in FIG. 13B, the first D1, the fifth pin D2, the third pin S1' and the sixth pin S2' are both □ -shaped, wherein the first pin D1 and the fifth pin D2 are both located between the third pin S1' and the sixth pin S2'. When the output pins of the second winding is disposed on the first side, the pin located on the first side, such as the first pin D1, the fifth pin D2, may also be other shapes such as C-shaped, which are not limited in this disclosure.

Figure 14A:
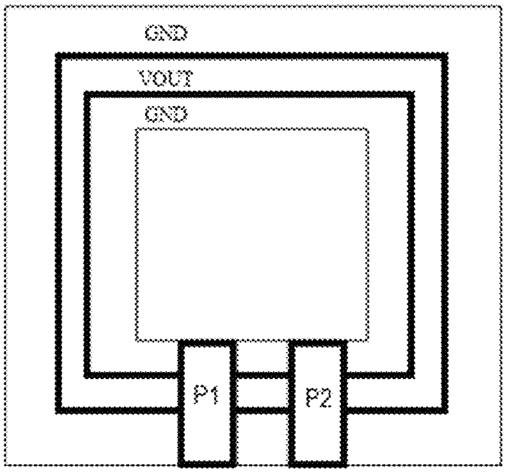
FIG. 14A is a bottom view of a transformer module provided by an embodiment of the present disclosure.
Figure 14B:
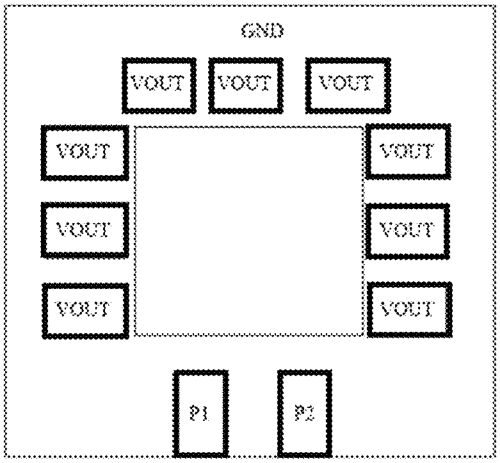
FIG. 14B is a bottom view of a transformer module provided by another embodiment of the present disclosure.

FIG. 14A is a bottom view of a transformer module provided by an embodiment of the present disclosure. As shown in FIG. 14A, an output PIN, such as VOUT, GND, etc., may be formed on a lower surface of the transformer module. In FIG. 14A, the pin VOUT is placed between two GND pins. FIG. 14B is a bottom view of a transformer module provided by another embodiment of the present disclosure. As shown in FIG. 14B, an output PIN, such as VOUT, GND, etc., may be formed on the lower surface of the transformer module. In FIG. 14B, the multiple pins VOUT are distributed almost evenly in the one big pin GND.

An embodiment of the present disclosure further provides a transformer module, since a transformer winding with a foil winded structure is coated on a transformer magnetic column, so that the equivalent diameters of respective parts of the winding having the foil winded structure are similar to each other, and the equivalent impedances are similar, thereby achieving the effect of even winding distribution.

Embodiment 8

Figure 15:
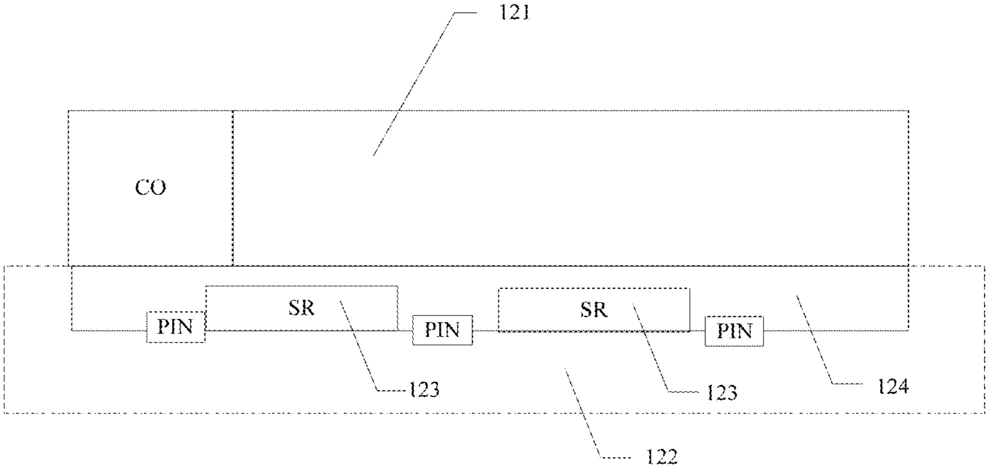
FIG. 15 is a cross-sectional view of a power module provided by another embodiment of the present disclosure.

FIG. 15 is a cross-sectional view of a power module provided by another embodiment of the present disclosure. As shown in FIG. 14, the power module includes:

a transformer module 121 such as the module in the embodiment 6; and a switch module 122, the switch module 122 and the first side (for example, an upper surface having a pin) of the transformer module 121 are in contact and are electrically connected with the first pin D1, the third pin S1', the fifth pin D2 and the sixth pin S2'.

In some embodiments, the switch module 122 includes a board 124 and at least two power switches (SR) 123. As shown in FIG. 15, the switch module 122 includes power switches (SR) 123, which are disposed in the board 124 by the molding, embedded process etc. At least one first SR is electrically connected to the first pin D1 and the third pin S1', and at least one second SR is electrically connected to the fifth pin D2 and a sixth pin S2'. Wherein, the power switch may be located on the lower surface of the transformer module, or the power switch may be located on the upper surface of the transformer module, which is not limited in this disclosure.

Specifically, the switch module is formed by directly integrating bare dies of one or more parallel SRs in a board by an embedded process. Pads corresponding to the transformer module's pins are formed on the lower surface of the board, and the switch module and the transformer module are soldered together to form a power module.

Alternatively, one or more parallel SRs are first welded to the surface of the board, and then the switch module is formed by a molding process, and a pad corresponding to the transformer module is formed on the other surface of the board, and the transformer module is welded on the surface of the board to form the power module.

Further, the power module further includes: a capacitor module, wherein the capacitor module is in contact with the second side of the transformer module and is electrically connected to the second pin and the fourth pin. Specifically, the power module may further include an LLC primary power unit, a controller, etc., so that the power module functions as an LLC converter. Alternatively, the capacitor module includes an output capacitor Co. The capacitor module may be placed on the switch module and beside the transformer. When the core of the transformer is a square or circle shape, the capacitor module may be place inside the window of the core, e.g. the hole of the core in FIG. 3A. Furthermore, the capacitor module may be placed on the board of the switch module or even embedded inside the board of the switch module. Furthermore, the capacitor module may be placed on one side of the transformer module e.g. the topside of the transformer module while the switch module is placed on the other side of the transformer module e.g. the bottom side of the transformer module or the adjacent sides of the top side of the transformer.

Alternatively, the power module may only include a primary power unit, a resonant unit, a controller, and an output capacitor.

Embodiment 9

Figure 16:
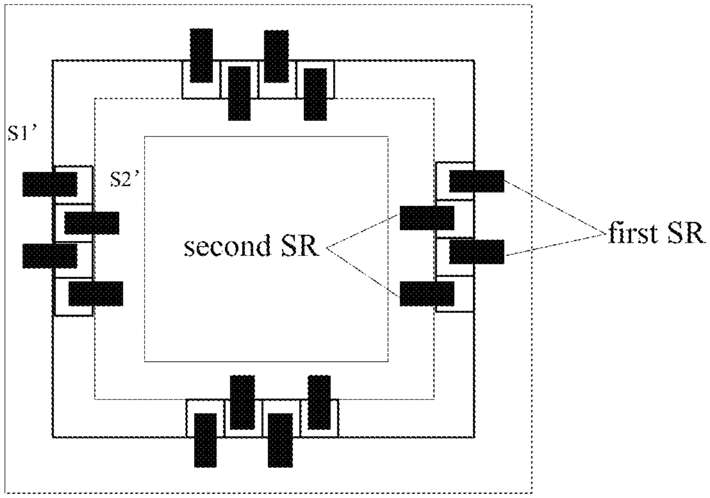
FIG. 16 is a top view of a power module provided by another embodiment of the present disclosure.

FIG. 16 is a top view of a power module provided by another embodiment of the present disclosure. As shown in FIG. 16, the power module includes:

a transformer module such as the module in the embodiment 7;

at least one first SR is in contact with the first surface (e.g., an upper surface having a pin) of the transformer module and is electrically connected to the first pin D1 and the third pin S1';

at least one second SR is in contact with the first side of the transformer module (e.g., the upper surface having pin) and is electrically connected to the fifth pin D2 and the sixth pin S2'.

Wherein, the SR may be a diode, a MOSFET or an IGBT or the like. The first SR and the second SR may be respectively encapsulated as switch modules, or may be integrated into a switch module. The disclosure is not limited to this.

In the embodiment 7 to the embodiment 9, the first metal winding and the second metal winding S1 and/or S2 in the circuit diagram shown in FIG. 7 may be separately segmented formed to lead out connection ends on different sides of the transformer module.

In some embodiments, such as Embodiment 7 to Embodiment 9, the correspondence of the surface-mounted pins is (but not limited to):

the first pin corresponds to D1, and the third pin corresponds to S1. According to FIG. 7 and FIG. 12B, correspondingly to the discontinuity point formed by the segmentations of the first metal winding, two ends of the switch (for example, a diode) can be electrically connected to the first pin and the third pin, respectively, to form a connection relationship between the switch and segments of the first metal winding in series;

the second pin corresponds to V0, and it can be seen from FIG. 7 and the like, the second pin can be an output end of the module;

the fourth pin corresponds to GND, and can be used for connection with the secondary grounding;

the fifth pin corresponds to D2, and the sixth pin corresponds to S2. According to FIG. 7 and FIG. 12B and the like, correspondingly to the discontinuity point formed by the segmentation of the second metal winding, the two ends of the switch (for example, a diode) can be electrically connected to the fifth pin and the sixth pin, respectively, to form a connection relationship between the switch and segments of the first metal winding in series.

However, in the embodiment 7 to the embodiment 9 of the present disclosure, for the convenience of description, the electrical connection points corresponding to the surface-mounted pins are different from the corresponding electrical connection points in the embodiment 1 to the embodiment 4, the present disclosure is not limited to this.

The transformer module of the foregoing embodiments may also lead the two ends of the third metal winding to the pins and may be led out to the first side, the second side or the other side, and the present disclosure is not limited thereto. The shape of the pin is not limited to the square-shape, C-shape, or other shapes shown in the figures, and can be flexibly changed according to the actual application.

Each of the metal windings of the transformer module of the foregoing embodiments can flexibly correspond to the primary winding and the secondary winding of different types of transformers, and can be used, for example, for the ordinary transformer of FIG. 3E or for the secondary tapped transformer (related to the two secondary windings in series), and can also be used for transformers with multiple independent secondary winding, etc., the disclosure is not limited to this.

It should be noted that the above power module is not limited to the LLC converter, and is also applicable to any circuit including a transformer module, such as a flyback converter, a full bridge circuit, and the like.

What is claimed is:

1. A transformer module, comprising:

a magnetic core, a first wiring layer, a first insulating layer and a second wiring layer, wherein the first wiring layer, the first insulating layer and the second wiring layer are sequentially disposed on the magnetic core from outside to inside;

a first metal winding, formed in the first wiring layer, wherein at least part of the first metal winding is wound around the magnetic core in a foil structure;

the first insulating layer, at least partially covered by the first metal winding;

a second metal winding, formed in the second wiring layer and wound around the magnetic core, wherein the second metal winding is at least partially covered by the first insulating layer, and at least partially covered by the first metal winding;

wherein, the transformer module further comprises a first pin, a second pin, the second metal winding comprises a first end and a second end, the first end and the second end of the second metal winding are electrically connected to the first pin and the second pin through a first connector and a second connector respectively, and at least one of the first connector and the second connector passes through and is at least partially surrounded by the first insulating layer;

wherein the dimension of the winding parallel to the longitudinal direction of the magnetic column is W, the thickness of the winding which is the dimension of the winding vertical to the magnetic column of the magnetic core is H, when H and W satisfy the relationship: W>10H, the winding has the foil structure.

2. The transformer module according to claim 1, wherein at least one of the first connector and the second connector also passes through the first wiring layer.

3. The transformer module according to claim 1, wherein the first connector and the second connector are vias.

4. The transformer module according to claim 1, wherein the first pin and the second pin are located on a first side of the transformer module for connection to an external circuit.

5. The transformer module according to claim 1, wherein the turns of the second metal winding is larger than or equal to the turns of the first metal winding.

6. The transformer module according to claim 1, wherein at least part of the second metal winding is wound around the magnetic core in the foil structure.

7. The transformer module according to claim 1, wherein the transformer module further comprises a third pin and a fourth pin, and the first end and the second end of the first metal winding respectively connected to the third pin and the fourth pin.

8. The transformer module according to claim 7, wherein the first, second, third and fourth pins are surface-mounted pins.

9. The transformer module according to claim 7, wherein length of a pin and length of a metal winding meet a proportional relationship as at least one of the following:

length of the first pin being greater than or equal to a half of length of the second metal winding; and length of the second pin being greater than or equal to a half of length of the second metal winding;

length of the third pin being greater than or equal to a half of length of the first metal winding; and length of the fourth pin being greater than or equal to a half of length of the first metal winding.

10. The transformer module according to claim 7, wherein length of pins and length of a metal winding meet a proportional relationship as at least one of the following:

the first pin being plural, and total length of the first pins being greater than or equal to a half of length of the second metal winding;

the second pin being plural, and total length of the second pins being greater than or equal to a half of length of the second metal winding;

the third pin being plural, and total length of the third pins being greater than or equal to a half of length of the first metal winding; and the fourth pin being plural, and total length of the fourth pins being greater than or equal to a half of length of the first metal winding.

11. A transformer module, comprising:

a magnetic core, a first wiring layer, a first insulating layer and a second wiring layer, wherein the first wiring layer, the first insulating layer and the second wiring layer are sequentially disposed on the magnetic core from outside to inside;

a first metal winding, formed in the first wiring layer, wherein at least part of the first metal winding is wound around the magnetic core in a foil structure;

the first insulating layer, at least partially covered by the first metal winding;

a second metal winding, formed in the second wiring layer and wound around the magnetic core, wherein the second metal winding is at least partially covered by the first insulating layer, and at least partially covered by the first metal winding;

wherein, the transformer module further comprises a first pin, a second pin, the second metal winding comprises a first end and a second end, the first end and the second end of the second metal winding are electrically connected to the first pin and the second pin through a first connector and a second connector respectively, and at least one of the first connector and the second connector passes through the first insulating layer and at least part of the projection of the first and second connectors in the first wiring layer is covered by the first metal winding;

wherein the dimension of the winding parallel to the longitudinal direction of the magnetic column is W, the thickness of the winding which is the dimension of the winding vertical to the magnetic column of the magnetic core is H, when H and W satisfy the relationship: W>10H, the winding has the foil structure.

12. The transformer module according to claim 11, wherein both of the first connector and the second connector also pass through the first wiring layer.

13. The transformer module according to claim 11, wherein the first connector and the second connector are vias.

14. The transformer module according to claim 11, wherein the first pin and the second pin are located on a first side of the transformer module for connection to an external circuit.

15. The transformer module according to claim 11, wherein the transformer module further comprises a third pin and a fourth pin, and the first end and the second end of the first metal winding respectively connected to the third pin and the fourth pin.

16. The transformer module according to claim 11, wherein at least part of the second winding is wound around the magnetic core in the foil structure.

17. The transformer module according to claim 15, wherein length of a pin and length of a metal winding meet a proportional relationship as at least one of the following:

length of the first pin being greater than or equal to a half of length of the second metal winding;

length of the second pin being greater than or equal to a half of length of the second metal winding;

length of the third pin being greater than or equal to a half of length of the first metal winding; and length of the fourth pin being greater than or equal to a half of length of the first metal winding.

18. The transformer module according to claim 15, wherein length of pins and length of a metal winding meet a proportional relationship as at least one of the following:

the first pin being plural, and total length of the first pins being greater than or equal to a half of length of the second metal winding;

the second pin being plural, and total length of the second pins being greater than or equal to a half of length of the second metal winding;

the third pin being plural, and total length of the third pins being greater than or equal to a half of length of the first metal winding; and the fourth pin being plural, and total length of the fourth pins being greater than or equal to a half of length of the first metal winding.

19. The transformer module according to claim 15, the first pin, the second pin, the third pin and the fourth pin are surface-mounted pins.

* * * * *